United States Patent
Mao et al.

(10) Patent No.: US 11,246,010 B2
(45) Date of Patent: Feb. 8, 2022

(54) METHOD AND SYSTEM FOR POSITIONING AND TRACKING USING A PLURALITY OF SENSORS

(71) Applicant: iWave Technologies Co., Ltd., Kaohsiung (TW)

(72) Inventors: Shau-Gang Mao, Kaohsiung (TW); Chong-Yi Liou, Kaohsiung (TW); Wei-Ting Tsai, Kaohsiung (TW); Ting-Wei Wu, Kaohsiung (TW); Yu-Yao Chen, Kaohsiung (TW); Jin-Feng Neo, Kaohsiung (TW); Zheng-An Peng, Kaohsiung (TW); Tsu-Yu Lo, Kaohsiung (TW); Je-Yao Chang, Kaohsiung (TW); Chien-Bang Chen, Kaohsiung (TW); Shih-Ping Huang, Kaohsiung (TW)

(73) Assignee: IWAVE TECHNOLOGIES CO., LTD., Kaohsiung (TW)

( * ) Notice: Subject to any disclaimer, the term of this patent is extended or adjusted under 35 U.S.C. 154(b) by 0 days.

(21) Appl. No.: 17/009,952

(22) Filed: Sep. 2, 2020

(65) Prior Publication Data
US 2021/0067915 A1 Mar. 4, 2021

Related U.S. Application Data

(60) Provisional application No. 62/895,287, filed on Sep. 3, 2019.

(51) Int. Cl.
*H04W 4/029* (2018.01)
*G01S 5/06* (2006.01)
(Continued)

(52) U.S. Cl.
CPC .......... *H04W 4/029* (2018.02); *G01S 5/0273* (2013.01); *G01S 5/0289* (2013.01); *G01S 5/0294* (2013.01);
(Continued)

(58) Field of Classification Search
CPC ....... H04W 4/029; H04W 4/02; H04W 4/021; H04W 4/33; H04W 4/30; H04W 4/70;
(Continued)

(56) References Cited

U.S. PATENT DOCUMENTS 8,330,654 B2 * 12/2012 Lo et al. ................ 342/457
10,178,510 B1 * 1/2019 Kai ........................ H04W 4/029
342/450

(Continued)

*Primary Examiner* — Meless N Zewdu
(74) *Attorney, Agent, or Firm* — Birch, Stewart, Kolasch & Birch, LLP

(57) ABSTRACT

A positioning and tracking system is disclosed. The positioning and tracking system includes positioning sensors disposed in a space, wherein the positioning sensors are all movable and all have functions of sensing distance, angle and time, and the positioning sensors communicate with each other to sense relative distances, relative angles and relative times between every two positioning sensors of the positioning sensors. when at least one of the positioning sensors moves in the space, the positioning sensors re-communicate with each other to instantly update the relative distances, the relative angles and the relative times between every two positioning sensors of the positioning sensors.

20 Claims, 15 Drawing Sheets

(51) Int. Cl.
*G01S 5/04* (2006.01)
*G01S 5/02* (2010.01)
*G01S 5/14* (2006.01)

(52) U.S. Cl.
CPC ...... *G01S 5/04* (2013.01); *G01S 5/06* (2013.01); *G01S 5/14* (2013.01)

(58) Field of Classification Search
CPC ....... H04W 4/80; H04W 4/024; H04W 4/023; H04W 84/18; G01S 5/00; G01S 5/06; G01S 5/04; G01S 5/02; G01S 5/14; G01S 5/0289; G01S 5/0294; G01S 5/0273; G01S 5/12; G01S 13/765; G01S 5/0242; G01S 13/42; G01S 13/0209; G01S 2205/02; G01S 1/00; G01S 1/02; G01S 1/024; G01S 1/08; G01S 1/72; G01S 1/76; G01S 3/02; G01S 5/0027; G01S 5/0249; G01S 5/0284; G01S 2201/00; G01S 2201/01; G01S 2201/02; G01S 2201/025; G01S 2205/00; G01S 2205/001; G01S 2205/002
See application file for complete search history.

(56) References Cited

U.S. PATENT DOCUMENTS

2011/0032152 A1*  2/2011  Lo et al.
2011/0156957 A1*  6/2011  Waite et al. .................. 342/450
2013/0332106 A1* 12/2013  Karvounis et al. ...... G01C 5/00
2020/0228943 A1*  7/2020  Martin et al. ........... H04W 4/33
2020/0256109 A1*  8/2020  Bean et al. ............. E05F 15/05

* cited by examiner

METHOD AND SYSTEM FOR POSITIONING AND TRACKING USING A PLURALITY OF SENSORS

CROSS REFERENCE TO RELATED APPLICATIONS

This non-provisional application claims the benefit under 35 U.S.C. § 119(e) to U.S. Provisional Application No. 62/895,287, filed on Sep. 3, 2019, which is hereby expressly incorporated by reference into the present application.

FIELD OF THE INVENTION

The invention relates to positioning and tracking, and specifically to a positioning and tracking system and a positioning and tracking method.

BACKGROUND OF THE INVENTION

Wireless positioning and tracking systems have received increasing attention rapidly for scenarios with accurate locations of people, objects and vehicles. Global Navigation Satellite System (GNSS) has been practically used for different kinds of applications. However, indoor location-based service cannot be carried out by GNSS because of signal attenuation and multipath effect in the complicated indoor environment. The conventional indoor positioning technologies, such as Wi-Fi, Bluetooth, radio-frequency identification (RFID), ultrasound and ultra-wideband (UWB) can be classified into two categories: multiliteration/multiangulation and fingerprint.

In multilateration, the distances between the targets and the base-stations need to be estimated based on time of arrival (TOA) or time difference of arrival (TDOA). In multiangulation, the directions from base-station to targets are determined based on angle of arrival (AOA). The difficulty of multilateration/multiangulation lies in the modeling of electromagnetic propagation in non-line-of-sight (NLOS) and dense multipath environment.

The fingerprint technique uses a matching algorithm to compare the online and offline signal characteristics such as the received signal strength indicator (RSSI) and the channel state information (CSI) to find the target location. However, the discrepancy arises due to the environmental variations, making a pre-trained model inaccurate.

One of the critical scenarios of wireless positioning systems is indoor tracking. In such application, the trajectories of people, objects, or vehicles are tracked and recorded by positioning system in an indoor environment. Positioning and tracking system using mm Wave band in 5G can be considered as UWB system due to its wide bandwidth. In recent years, the 5G development draws a significant attention on spectral efficiency and coverage. A vision of on-vehicle positioning and mapping system using 5G for automated driving applications was proposed. Driven by emerging 5G applications, UWB system for indoor positioning and tracking are now providing opportunities to academia and industry.

The TOA/TDOA UWB system with high temporal resolution to detect the first path in multipath propagation is attractive to the indoor positioning and tracking applications. There are UWB chips available in the commercial market, such as Ubisense, BeSpoon and Decawave. However, the accuracy of the UWB-based positioning technology is not satisfactory because it is strongly affected by multipath effects including reflection, refraction and diffraction, especially in the NLOS conditions when the received signal contains no direct line-of-sight (LOS) component. Hence, the UWB tags and anchors under the NLOS condition need to be identified and the NLOS effect needs to be mitigated.

Moreover, the measured range between anchor and tag varies as their corresponding orientation changes. The variation of the antenna time delay in different orientations should be as small as possible to maximize the accuracy of the positioning system. Notably, a variation of 1 ns in time delay causes an error of 30 cm in range estimation, and the remarkable time delay is observed when the tag antenna and anchor antenna are cross-polarized.

A UWB positioning system with independent orientation of tag and anchor by using the circularly polarized antenna with omnidirectional radiation and low time-delay variation was previously proposed. The frequency-domain characteristics of the presented antenna, such as |S11| and axial ratio, was also investigated.

Indoor environments are normally filled with obstacles, walls, human beings, and infrastructures which can affect the electromagnetic wave distribution, making wireless positioning and tracking of target a challenge. As the number of multipath increases, the accuracy of a UWB positioning system decreases. Therefore, eliminating the NLOS effect and determining the optimal locations of the anchors in a complicated environment are critical for minimizing the average positioning error of all tags. Previous studies mitigated NLOS error by using a support vector machine method, a fuzzy inference method with NLOS propagation, or a fuzzy comprehensive evaluation method with the equality constrained Taylor series robust least squares technique. All these methods offer improved accuracy, but they are insufficient without considering all multipath effects. Channel impulse response (CIR) contains the multipath effect and can be utilized to mitigate NLOS conditions. A convolutional neural network (CNN) using CIR with NLOS mitigation was proposed, presenting a mean error of 65 cm with three anchors under NLOS conditions.

SUMMARY OF THE INVENTION

In light of the above, one of the objectives of the invention is to provide a positioning and tracking system and a positioning and tracking method with arbitrary target orientation, optimal anchor location and adaptive NLOS mitigation for improving the accuracy of wireless positioning and tracking in the complicated indoor environment under LOS and NLOS conditions.

An embodiment of the invention is a positioning and tracking system. In this embodiment, the positioning and tracking system includes a plurality of positioning sensors disposed in a space. The plurality of positioning sensors is all movable and all has functions of sensing distance, angle and time, and the plurality of positioning sensors communicates with each other to sense relative distances, relative angles and relative times between every two positioning sensors of the plurality of positioning sensors. When at least one of the plurality of positioning sensors moves in the space, the plurality of positioning sensors re-communicates with each other to instantly update the relative distances, the relative angles and the relative times between every two positioning sensors of the plurality of positioning sensors.

In an embodiment of the invention, the plurality of positioning sensors communicates with each other through ultra-wideband (UWB) technology.

In an embodiment of the invention, the positioning and tracking system uses circularly polarized antennas with omnidirectional radiation and low time-delay variation to achieve independent orientation of the plurality of positioning sensors.

In an embodiment of the invention, the plurality of positioning sensors comprises at least one anchor and at least one tag, the at least one anchor and the at least one tag communicate with each other to sense relative distances, relative angles and relative times between them; the at least one of the plurality of positioning sensors moving in the space is anchor and/or tag.

In an embodiment of the invention, an orientation between the at least one anchor and the at least one tag is arbitrary by using a circularly polarized antenna with wide bandwidth and omnidirectional radiation.

In an embodiment of the invention, at least one location of the at least one anchor is optimized to minimize average positioning error of the at least one tag by using genetic algorithm (GA) with non-line-of-sight (NLOS) electromagnetic wave models.

In an embodiment of the invention, after the relative distances, the relative angles and the relative times of the plurality of positioning sensors are instantly updated, at least one path of the at least one positioning sensor moving in the space is obtained.

In an embodiment of the invention, the at least one path is calibrated by Deep Neural Network (DNN), Convolutional Neural Network (CNN) or Long-Short Term Memory (LSTM) model to develop adaptive NLOS mitigation.

In an embodiment of the invention, another at least one positioning sensor of the plurality of positioning sensors moves along the at least one path in the space to track the at least one positioning sensor in a complicated NLOS environment.

In an embodiment of the invention, the at least one path is a non-closed path or a closed path forming at least one area.

Another embodiment of the invention is a positioning and tracking method. In this embodiment, the positioning and tracking method includes steps of: disposing a plurality of positioning sensors in a space, wherein the plurality of positioning sensors is all movable and all has functions of sensing distance, angle and time; the plurality of positioning sensors communicating with each other to sense relative distances, relative angles and relative times between every two positioning sensors of the plurality of positioning sensors; and when at least one of the plurality of positioning sensors moves in the space, the plurality of positioning sensors re-communicating with each other to instantly update the relative distances, the relative angles and the relative times between every two positioning sensors of the plurality of positioning sensors.

Compared to the prior art, the invention provides the positioning and tracking system and the positioning and tracking method with arbitrary target orientation, optimal anchor location, and adaptive NLOS mitigation to improve the accuracy of wireless positioning and tracking in the complicated indoor environment under LOS and NLOS conditions.

To further learn the features and technical content of the invention, please refer to the following detailed descriptions and drawings related to the invention. However, the provided drawings are used only for providing reference and descriptions, and are not intended to limit the invention.

DETAILED DESCRIPTION OF THE PREFERRED EMBODIMENTS

Figure 1A:
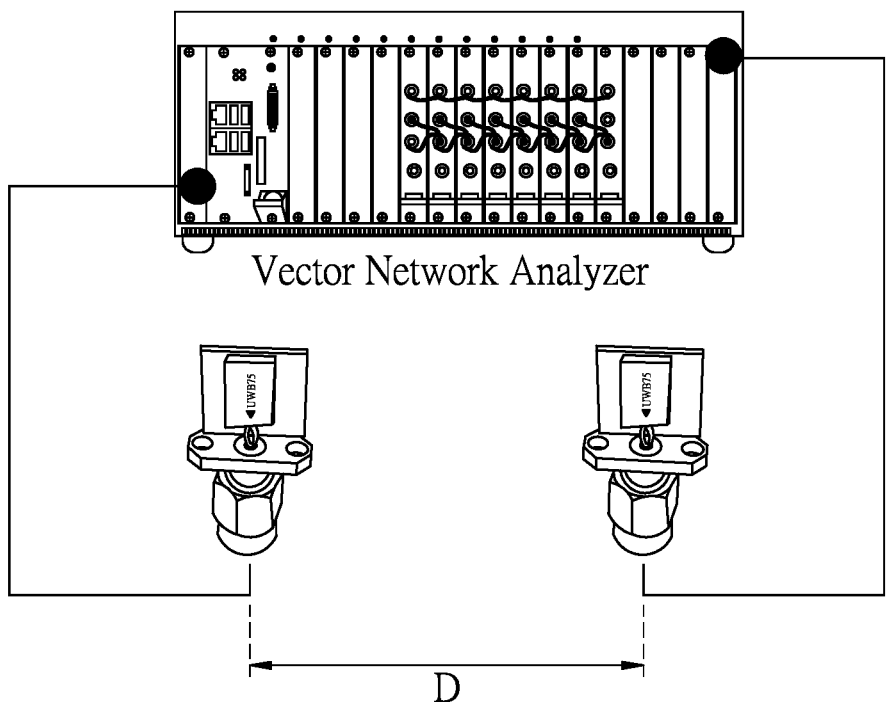
FIG. 1A illustrates measurement setup of time-domain characterization with the linearly polarized antenna in the prior art.

An embodiment of the invention is a positioning and tracking system with arbitrary target orientation, optimal anchor location, and adaptive NLOS mitigation for improving the accuracy of wireless positioning and tracking in the complicated indoor environment under LOS and NLOS conditions.

In this embodiment, the positioning and tracking system includes a plurality of positioning sensors disposed in a space. The plurality of positioning sensors is all movable and all has functions of sensing distance, angle and time, and the plurality of positioning sensors communicates with each other to sense relative distances, relative angles and relative times between every two positioning sensors of the plurality of positioning sensors.

When at least one of the plurality of positioning sensors moves in the space, the plurality of positioning sensors re-communicates with each other to instantly update the relative distances, the relative angles and the relative times between every two positioning sensors of the plurality of positioning sensors. And then, at least one path of the at least one positioning sensor moving in the space can be obtained. Another at least one positioning sensor of the plurality of positioning sensors can move along the at least one path in the space to track the at least one positioning sensor in a complicated NLOS environment.

In this embodiment, the wide bandwidth and omnidirectional radiation of the circularly polarized antenna are applied to enhance the time-domain characteristics of UWB system with high signal fidelity (>0.98), low standard deviation (STD) of time delay (<0.05 ns), and arbitrary orientation between tag and anchor.

Next, the electromagnetic wave propagation models for various NLOS conditions are investigated. The locations of three anchors in the UWB positioning system are determined by using genetic algorithm (GA) to minimize the average positioning error to 36.72 cm for a 45 m² area with concrete walls and pillars. Furthermore, it takes only 28.47 hours in practical test to optimize anchor locations by using the proposed GA, which is efficient compared to the conventional exhaustive method with 7.7 years calculating time.

In addition, the adaptive NLOS mitigation is presented by using and optimizing machine learning models, including deep neural network (DNN), CNN and long short-term memory (LSTM). For the three-anchor UWB positioning system with the adaptive NLOS mitigation, the trajectory of autonomous vehicle is demonstrated by using the proposed circularly polarized antenna combined with the optimized LSTM model to achieve the measured positioning error of 26.1 cm. Moreover, by using optimized LSTM model, the measured result of positioning error is 20-30 cm for a 45 m² indoor severe NLOS environment with concrete walls, pillars and walking humans.

The rest of this invention is organized as follows. [Section I] investigates the time-domain characteristics of tag and anchor with arbitrary orientation by using the circularly polarized antennas. The anchor locations are optimized to obtain the minimal tag positioning error by introducing the GA with NLOS electromagnetic wave propagation models. The adaptive NLOS mitigation is also developed by optimizing DNN, CNN and LSTM. The simulated and measured results in the practical area with concrete walls, pillars and walking humans are presented in [Section II] to validate our proposed UWB system for wireless positioning and tracking applications in a complicated NLOS environment. [Section III] summarizes the invention and discusses future directions.

[Section I]

(1) Arbitrary Target Orientation

Figure 1B:
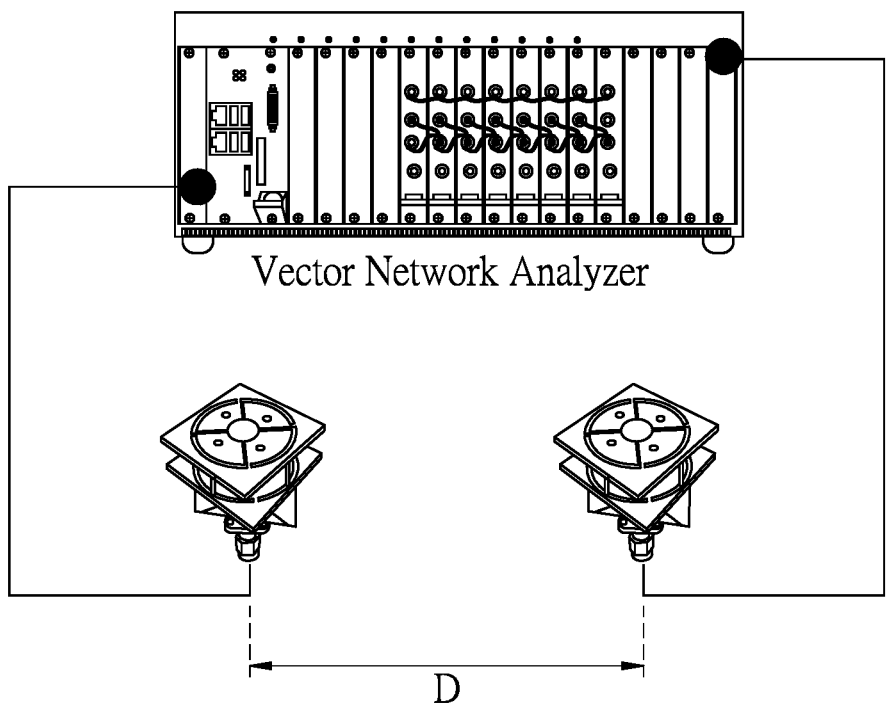
FIG. 1B illustrates the measurement setup of the time-domain characterization with the circularly polarized antenna by using the vector network analyzer of Keysight PXIe.
Figure 2A:
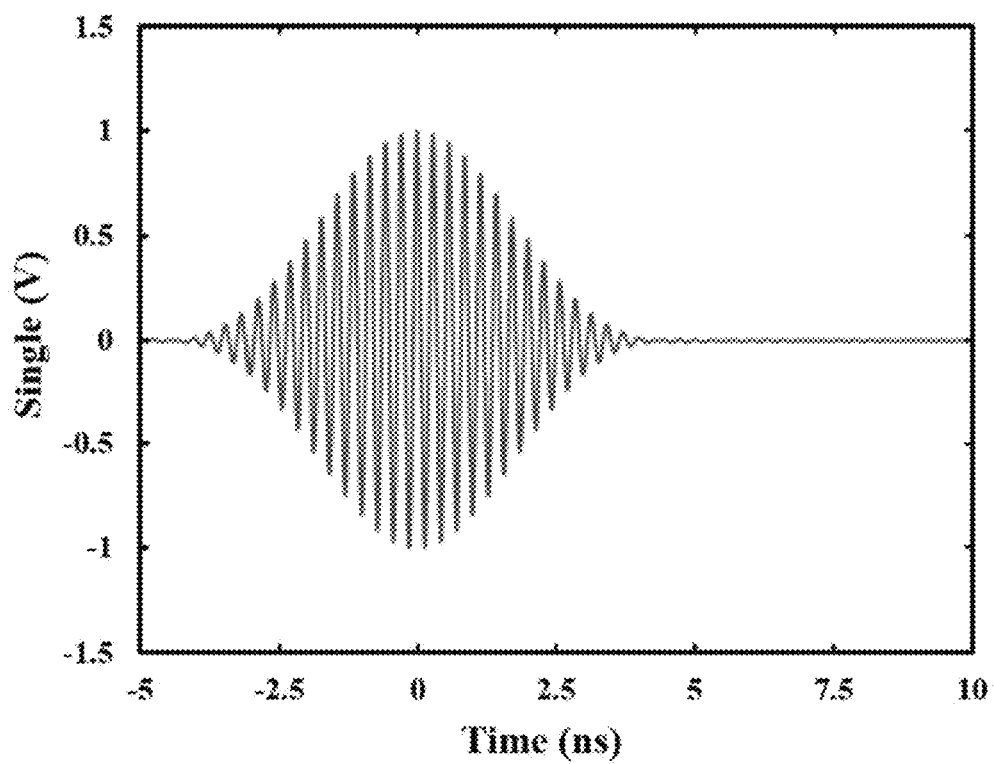
FIG. 2A illustrates the time-domain waveform of the input pulse.
Figure 2B:
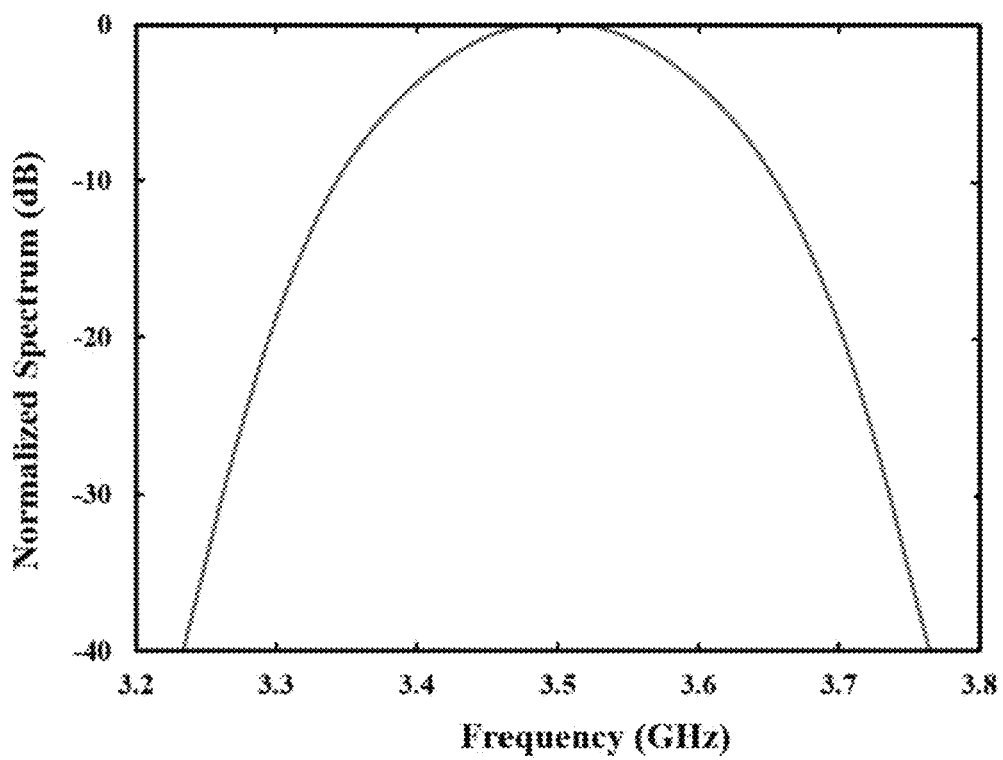
FIG. 2B illustrates the normalized power spectrum of the input pulse.

Our previous work proposed the design and implementation of a circularly polarized antenna to realize a UWB positioning system with arbitrary target orientation, and the characteristics of the antenna in frequency domain were measured and discussed, such as |S11| and axial ratio. In this paper, the property of the antenna in time domain is further investigated. Two identical circularly polarized or linearly polarized antennas are under a LOS condition to examine the performances, as presented in FIG. 1. The input pulse and the measured pulse responses of two antennas with different LOS distances D=25, 50, 75 cm are shown in FIG. 2A and FIG. 2B. The input pulse with a pulse width of 6 ns, corresponding to −10 dB power bandwidth from 3.3 to 3.7 GHz, is used for the transmitted signal, as shown in FIG. 2A and FIG. 2B. The signal fidelity of the transmitted signal $S_t(t)$ and the received signal $S_r(t)$ with the linearly polarized antenna or the circularly polarized antenna is calculated as the following equation (1):

$$\text{Fidelity} = \max_{\tau} \frac{\int_{-\infty}^{\infty} s_i(t) s_r(t-\tau) dt}{\sqrt{\int_{-\infty}^{\infty} |s_i(t)|^2 dt \cdot \int_{-\infty}^{\infty} |s_r(t)|^2 dt}}. \quad (1)$$

Figure 2C:
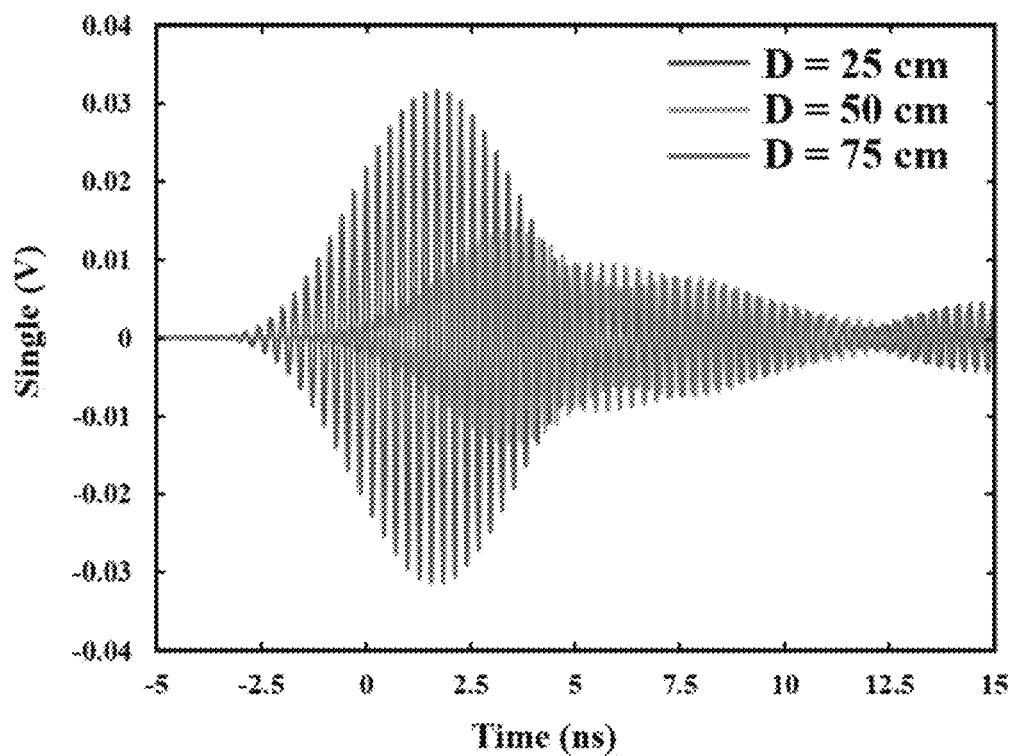
FIG. 2C illustrates the measured pulse response using the conventional linearly polarized antenna with D=25, 50, 75 cm in the prior art.
Figure 2D:
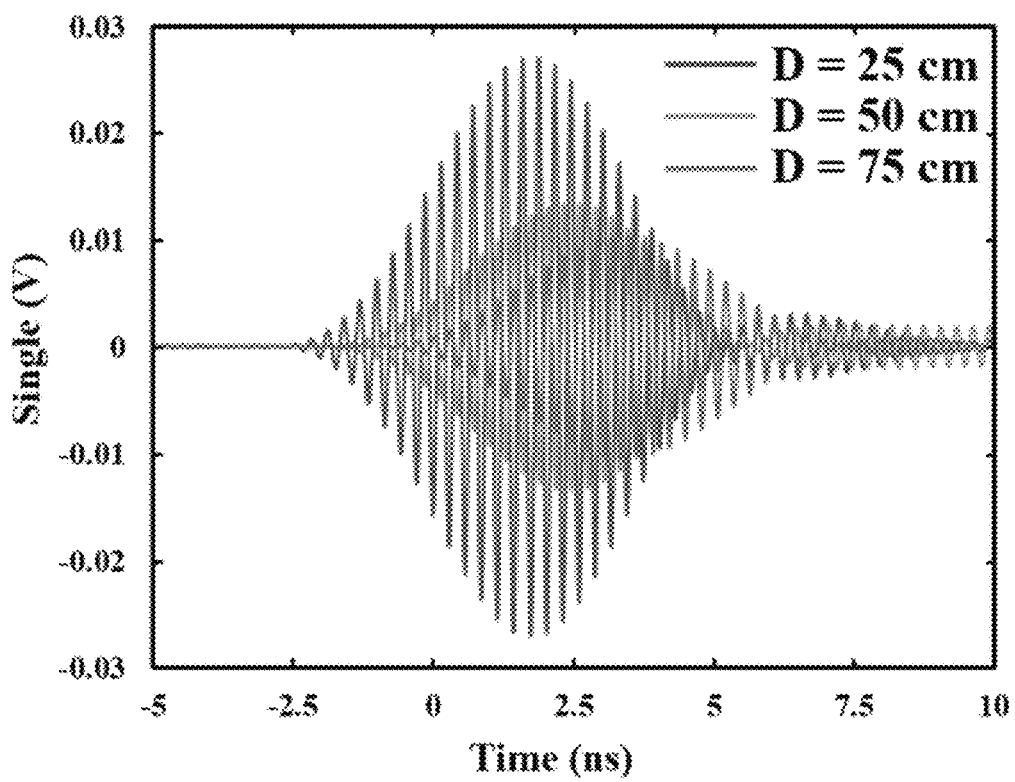
FIG. 2D illustrates the measured pulse response using the proposed circularly polarized antenna with D=25, 50, 75 cm.

The signal fidelity using the linearly polarized antennas (FIG. 2C) is 0.955, 0.792, 0.689 for D=25, 50, 75 cm, respectively. The signal fidelity using the circularly polarized antennas (FIG. 2D) is 0.990, 0.981, 0.992 for D=25, 50, 75 cm, respectively. Results show that the fidelities of the circularly polarized antenna are higher than those of the linearly polarized antenna. Hence, the proposed circularly polarized antenna is suitable for the UWB positioning system in channel 1 of DWM1000 module. Furthermore, the time delay of antenna, which influences ranging, can be estimated from the group delay of measured S21:

$$\frac{-d\theta_{21}}{d\omega} = t_{Tx} + t_{channel} + t_{Rx}. \quad (2)$$

Figure 3:
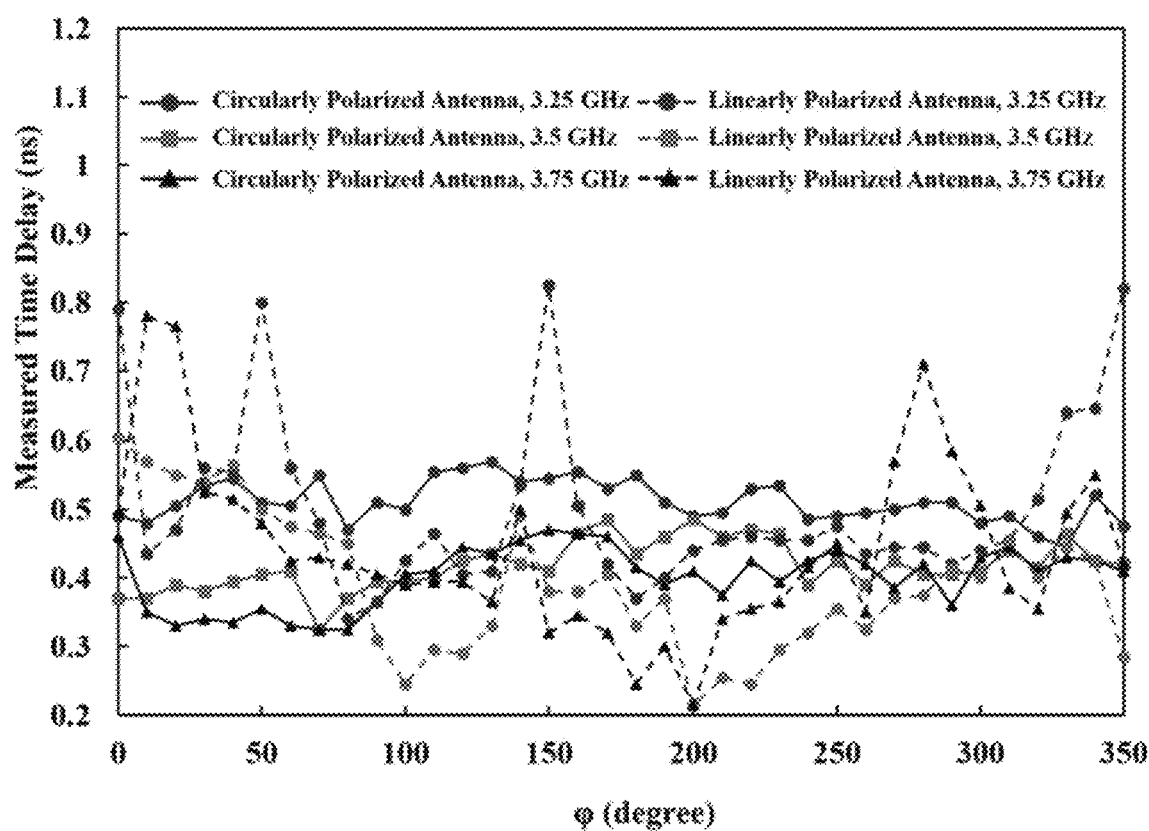
FIG. 3 illustrates the measured time delays of the linearly polarized antenna and the circularly polarized antenna at 3.25, 3.5, and 3.75 GHz and the orientation vertical with $\varphi$ from 0° to 350°.

In the equation (2), θ21 is the phase of measured S21, ω is the angular frequency, $t_{channel}$ is the propagating time between transmitter and receiver, and $t_{Tx}$ and $t_{Rx}$ are the time delays of transmitter and receiver antennas, respectively. For two identical antennas fixed in the same orientation, tTx is equal to tRx. For LOS condition, tchannel is equal to D/c, where c is the speed of light in the air. By rotating two identical antennas at the same angle under LOS condition, the time delays of linearly polarized antenna and circularly polarized antenna can be calculated by the equation (2) and depicted in FIG. 3. The variation of time delay using circularly polarized antenna is less than that using linearly polarized antenna, indicating that it is suitable for UWB positioning and tracking system with arbitrary target orientation. The STD of time delay are shown in Table I for comparison.

TABLE I

| Antenna Type | Operating Frequency | STD of time delay (ns) |
|---|---|---|
| Linearly Polarized Antenna | 3.25 GHz | 0.128 |
| | 3.5 GHz | 0.101 |
| | 3.75 GHz | 0.128 |
| Circularly Polarized Antenna | 3.25 GHz | 0.031 |
| | 3.5 GHz | 0.036 |
| | 3.75 GHz | 0.044 |

Figure 4A:
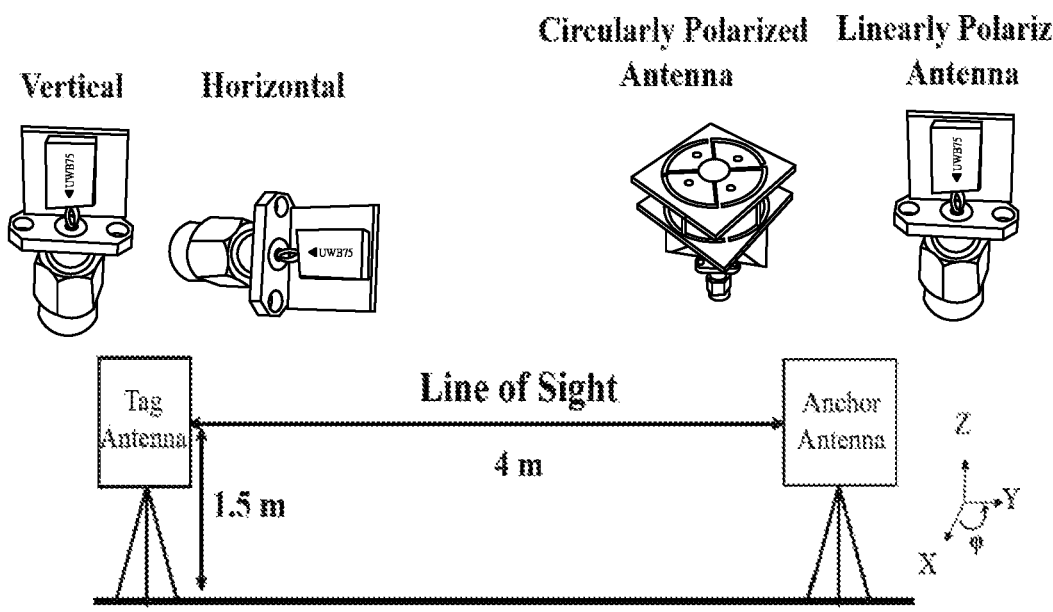
FIG. 4A illustrates the measurement setup of one-to-one ranging system.

To verify the arbitrary target orientation of the UWB system using the circularly polarized antenna, a one-to-one ranging system is established as depicted in FIG. 4A. The tag antenna is linearly polarized, and its orientation is vertical or horizontal corresponding to the ground plane. The anchor antenna is linearly polarized or circularly polarized, and its orientation is vertical with rotating angle φ from −225° to 90°.

Figure 4B:
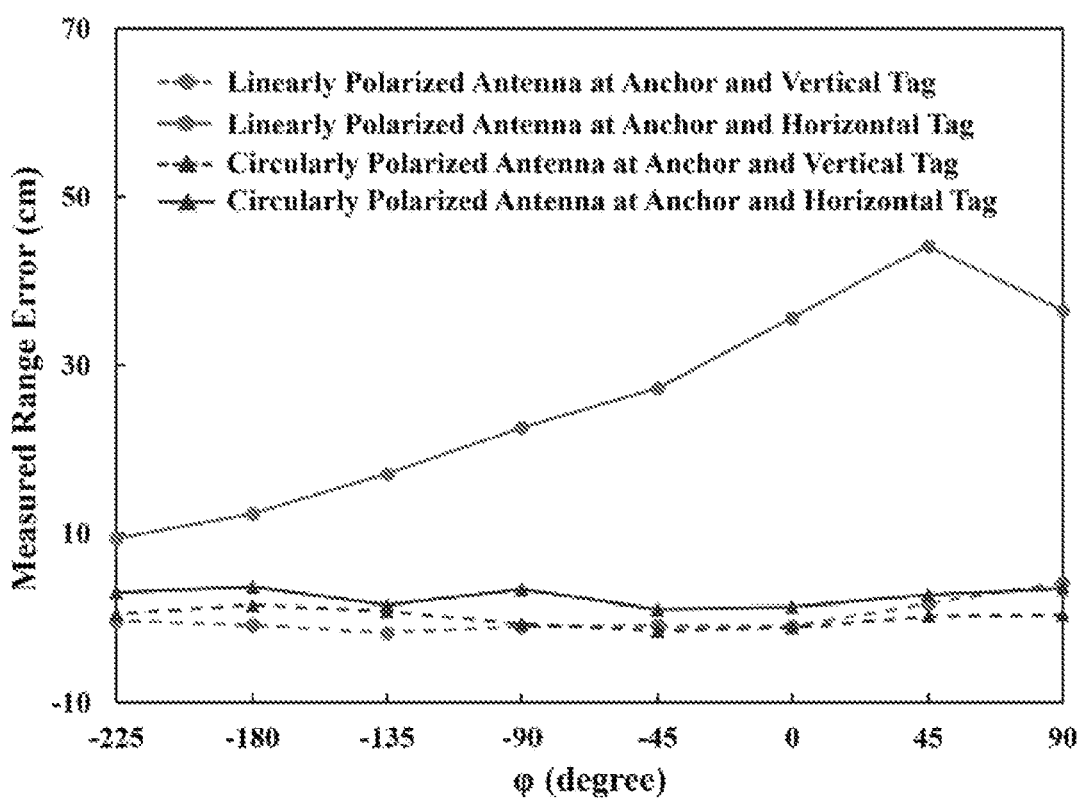
FIG. 4B illustrates the range errors measured by one-to-one system with the linearly polarized antenna and the circularly polarized antenna.

FIG. 4B illustrates the range errors of a one-to-one UWB system by using DWM1000 modules with the symmetric double-sided two-way ranging technique. The maximal range error of a linearly polarized antenna with a horizontal tag is 45 cm, so the antenna cannot be used in a positioning system with the required accuracy of the order of 10 cm. The range errors of a circularly polarized antenna with a vertical tag and a horizontal tag are smaller than 10 cm, which is suitable for an accurate UWB positioning and tracking system.

(2) Optimal Anchor Location

Figure 5A:
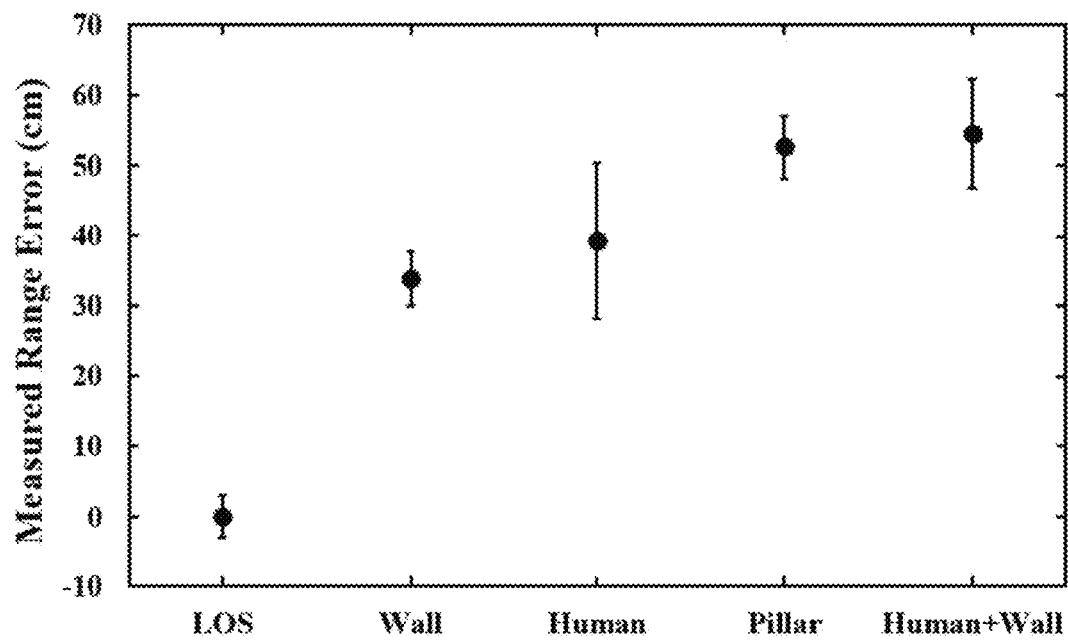
FIG. 5A illustrates the means and STDs of range errors measured by one-to-one system with LOS condition and various obstacles. The point and the bar represent the mean and STD of the range errors, respectively.
Figure 5B:
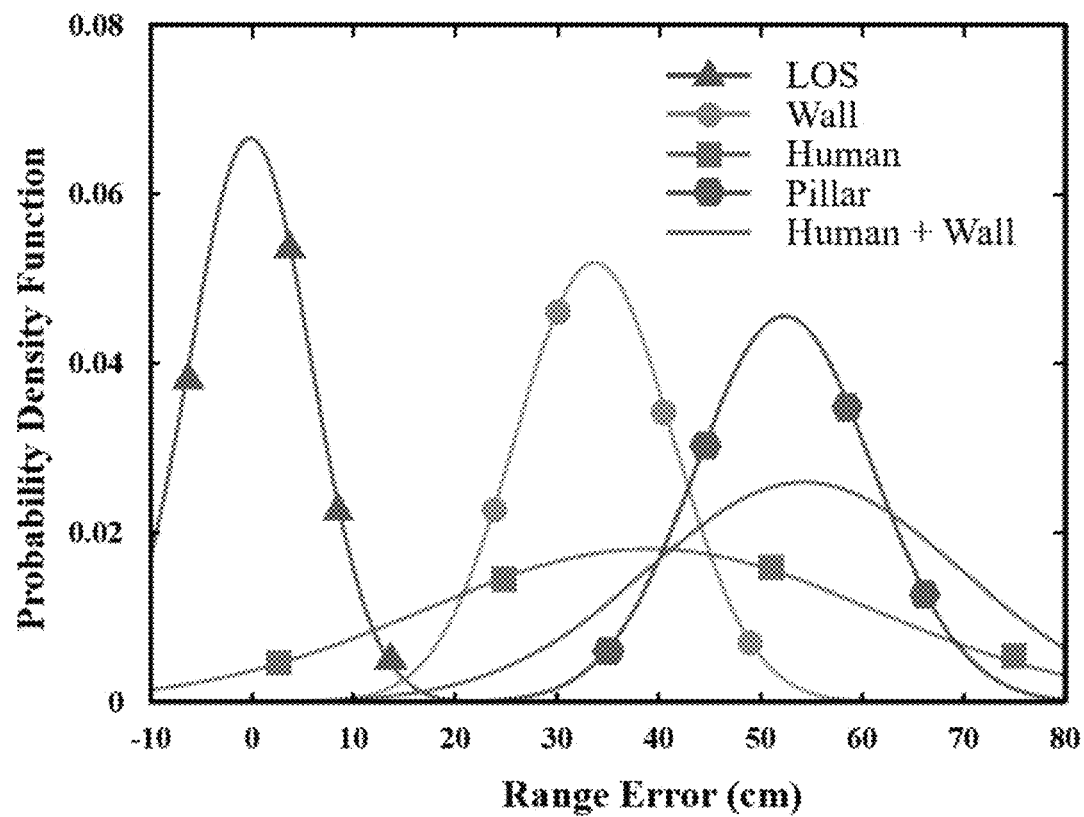
FIG. 5B illustrates the PDFs of Gaussian distributions with LOS condition and various obstacles.

To verify the effect of NLOS propagation in the wireless positioning and tracking system, the measurement of the one-to-one UWB system under LOS condition and various NLOS conditions is carried out. A concrete wall, a human body, a pillar, and a human body with concrete wall are inserted between transmitter and receiver as the obstacles, and the result is shown in FIG. 5A. In each case, the point and the bar represent the mean and the STD of the range errors for 3000 measured data, respectively. The largest mean of range error for human body with concrete wall is 54.51 cm, and the largest STD of range error for a human body is 22.05 cm. The NLOS effects with various obstacles are modeled by Gaussian distributions with means and STDs shown in FIG. 5A. The corresponding probability density functions (PDFs) of Gaussian distributions with various obstacles are depicted in FIG. 5B. These results will be applied to GA simulation to find the optimal anchor locations. With the validation of the one-to-one ranging system, a positioning system with one tag and N anchors can be established. The positions of N anchors are given by $(x_1, y_1)$, $(x_2, y_2), \ldots, (x_N, y_N)$, and the position of a tag $(x, y)$ is determined by minimizing the loss function (3):

$$f(x, y) = \sum_{k=1}^{N} \left( \sqrt{(x_k - x)^2 + (y_k - y)^2} - r_k \right)^2, \quad (3)$$

where $r_k$ is the distance between tag and the k-th anchor.

To minimize the loss function (3), the gradient descent method is developed based on the following partial differentials of the loss function:

$$\frac{\partial f}{\partial x} = f_x(x, y) = \sum_{k=1}^{N} \frac{-2(x_k - x)\left(\sqrt{(x_k - x)^2 + (y_k - y)^2} - r_k\right)}{\sqrt{(x_k - x)^2 + (y_k - y)^2}} \quad (4)$$

and $$\frac{\partial f}{\partial y} = f_y(x, y) = \sum_{k=1}^{N} \frac{-2(y_k - y)\left(\sqrt{(x_k - x)^2 + (y_k - y)^2} - r_k\right)}{\sqrt{(x_k - x)^2 + (y_k - y)^2}}. \quad (5)$$

Then, the adaptive gradient algorithm is applied, and the recursive functions of x and y we used are shown below:

$$x_n = x_{n-1} - \frac{f_x(x_n, y_n)}{\sqrt{\sum_{i=1}^{n} f_x(x_i, y_i)^2}} \quad (6)$$

$$y_n = y_{n-1} - \frac{f_y(x_n, y_n)}{\sqrt{\sum_{i=1}^{n} f_y(x_i, y_i)^2}}. \quad (7)$$

The detail and implementation of this method is shown in the following Algorithm 1.

| Algorithm 1 Function Gradient_Descent( ) | |
|---|---|
| Input | Locations of anchors $(x_1, y_1)$, $(x_2, y_2)$, $(x_3, y_3)$ |
| | Measured ranges $r_1, r_2, r_3$ |
| | Maximal iteration time max_iter |
| | Initial location $(x_{init}, y_{init})$ |
| Output | Estimated location of tag $(x_t, y_t)$ |
| 1 | Set weight_x to $10^{-10}$; |
| 2 | Set weight_y to $10^{-10}$; |
| 3 | Set (x , y) to $(x_{init}, y_{init})$; |
| 4 | while times < max_iter do |
| 5 | use (4), (5) to calculate $f_x$, $f_y$; |
| 6 | Set weight_x to (weight_x + $f_x^2$); |
| 7 | Set weight_y to (weight_y + $f_y^2$); |
| 8 | Set x to (x − $f_x$/(weight_x)$^{1/2}$); |
| 9 | Set y to (y − $f_y$/(weight_y)$^{1/2}$); |
| 10 | times++; |
| 11 | end while |
| 12 | return (x , y) |

Under the NLOS conditions with various obstacles between anchor and tag in FIG. 5A, the range errors of rk are determined by considering Gaussian distributions shown in FIG. 5B. For a given complicated environment, the NLOS effects of UWB positioning and tracking system can be reduced by properly locating the anchors. Generally, the exhaustive method is utilized to identify the anchor locations, but it is time-consuming when the number of candidate anchor locations increases. Hence, an efficient GA is applied to optimize the anchor locations and minimize the positioning errors in the complicated NLOS environment. The procedure of the proposed GA and its operators are shown as the following Algorithms 2-5.

| | Algorithm 2 Anchor_Placement_GA |
|---|---|
| Input | Candidate anchor corodinate $V_{anchor}$ |
| | Number of anchors N, |
| | Number of chromosomes P, |
| | Candidate tag coordinate $V_{tag}$, |
| | Maximal number of iteration max_iter, |
| Output | Best placement L |
| 1 | for s = 1 to P do |
| 2 |   Choose a chromosome of N coordinates from $V_{anchor}$ |
| 3 | end for |
| 4 | Calculate the number of coordinates in V? denoted by M; |
| 5 | while times < max_iter do |
| 6 |   for each chromosome do |
| 7 |     for each tag location i = 1 to M do |
| 8 |       Calculate the distances between tag, and anchor, denoted by $r_1, r_2, ..., r_N$; |
| 9 |       for each simulation j = 1 to 1000 do |
| 10 |         for each anchor location k = 1 to N do |
| 11 |           set $r_k$ to $(r_k + \delta)$ $\delta$ is a random number, the Gaussian distribution of $\delta$ is decided by FIG. 5; |
| 12 |         end for |
| 13 |         Apply function gradiant_decent( ) to get $(x_t, y_t)$; |
| 14 |         Calculate the distance between tag location and $(x_t, y_t)$; |
| 15 |       end for |
| 16 |       Calculate the root-mean-square distance, denoted by d; |
| 17 |     end for |
| 18 |     Calculate the average error e = mean(d, = 1 to M); |
| 19 |   end for |
| 20 |   Sort P chromosome by average error e, small first; |
| 21 |   Record the best chromosome so far, denoted by $C_{Best}$ |
| 22 |   Selection( ), Crossover( ), and Mutation( ); |
| 23 |   times++; |
| 24 | end while |
| 25 | return $C_{Best}$ |

| | Algorithm 3 Function Selection( ) |
|---|---|
| Input | Sorted population $V_{input}$, |
| | Best chromosome so far $C_{Best}$ |
| Output | Population after selection $V_{output}$ |
| 1 | Calculate the size of $V_{input}$, denoted as P; |
| 2 | Set $V_{input}(P)$ to $C_{Best}$; |
| 3 | return $V_{input}$ |

| | Algorithm 4 Function Crossover( ) |
|---|---|
| Input | Selected population $V_{input}$, |
| | Number of anchors N |
| Output | Population after crossover $V_{output}$ |
| 1 | Calculate the size of $V_{input}$, denoted as P; |
| 2 | for t = 1 to P/2 do |
| 3 |   randomly choose two numbers from 1 to N. denoted as a, b; |
| 4 |   exchange $V_{input}(i)(a)$ and $V_{input}(P+1-i)(b)$; |
| 5 | end for |
| 6 | return $V_{input}$ |

| | Algorithm 5 Function Mutation( ) |
|---|---|
| Input | Population after crossover $V_{input}$, |
| | Number of anchors N, |
| | Candidate anchor coordinate $V_{anchor}$, |
| | Rate of mutation M |
| Output | Population after mutation $V_{output}$ |
| 1 | Calculate the size of $V_{input}$, denoted as P; |
| 2 | for i = 1 to P do |
| 3 |   randomly generate number m between 0 to 1; |
| 4 |   if m < M do |
| 5 |     randomly choose a number from 1 to N, denoted as a; |
| 6 |     randomly choose a coordinate from $V_{anchor}$, denoted as C; |
| 7 |     Set $V_{input}(i)(a)$ to C; |
| 8 |   end if |
| 9 | end for |
| 10 | return $V_{input}$ |

The genetic operators of GA are selection, crossover, and mutation. In the initial generation, three locations of anchors in a given area are randomly chosen and sequentially arranged to represent as a chromosome, and eight chromosomes constitute a population. Then the population is sorted by average positioning error, and the next population is generated by selection, crossover, and mutation. In each generation, the genetic operators generate a new population, and the best chromosome with the lowest error in all generations is recorded as $C_{Best}$. For the selection operator, the chromosome $C_{Best}$ is duplicated and the worst chromosome in this generation is deleted. For the crossover operator, a location of anchor in each chromosome is randomly chosen and exchanged with another one. A mutation operator randomly occurs depending on the mutating rate, and the location of one anchor in the mutating chromosome randomly changes into another location. The population becomes a new generation through the combination of selection, crossover, and mutation, and the error of $C_{Best}$ iteratively decays to reach the condition of termination.

(3) Adaptive NLOS Mitigation

CIR from UWB positioning and tracking system with multipath information is useful for analyzing NLOS conditions and can be expressed as:

$$h(t) = \sum_{n=0}^{N-1} A_n e^{j\varphi_n} \delta(t - \tau_n), \tag{8}$$

where N is the total number of received impulses, and $A_n, \varphi_n, \tau_n$ represent the amplitude, phase, and time delay respectively.

CNN is commonly applied to analyze images with a two-dimensional convolutional layer. Therefore, it is useful in analyzing a waveform, such as CIR, with a one-dimensional convolutional layer. However, the lengths of convolutional filters are commonly below 10 which is not enough to cover some characteristics of CIR, and the variation of CIR is difficult to detect because it is not periodic.

LSTM can be applied to the data sequences, such as text and spoken word. LSTM is different from DNN and CNN because of the feedback loop connected to its past decisions, and the memory helps LSTM analyze the relationship between present data and previous data. By treating CIR as the data sequence, LSTM analyzes the dependencies among the elements from CIR but CNN does not. To the best of our knowledge, this is the first time that LSTM is applied to analyze CIR.

In this work, the CIR with sampling number N=150 and time interval $\tau_n - \tau_{n-1} = 1$ ns in the equation (8) is used as the input, and the final output is the predicted NLOS range error. For the DNN model, the magnitude of CIR is normalized as:

$$m_{normalized} = \frac{m_{CIR} - \min(m_{CIR})}{\max(m_{CIR}) - \min(m_{CIR})}. \tag{9}$$

The equation (9) can be utilized to map the magnitude of CIR into a sequence of data whose values are between 0 and 1, and the normalized data are the input of the DNN model. For the CNN model, the alignment of the CIR in the preprocessing is achieved by correlating all CIR with the first CIR and shifting the peak index of the correlated CIR. After the alignment, the normalized and aligned CIR through the equation (9) is the input of the CNN model. To obtain time-series information and to analyze the dependencies among the elements from CIR, LSTM is further developed, and the preprocessing is also based on the equation (9).

The final outputs of all three models are the predicted NLOS range errors to mitigate the ranges measured by the UWB positioning and tracking system.

Figure 6A:
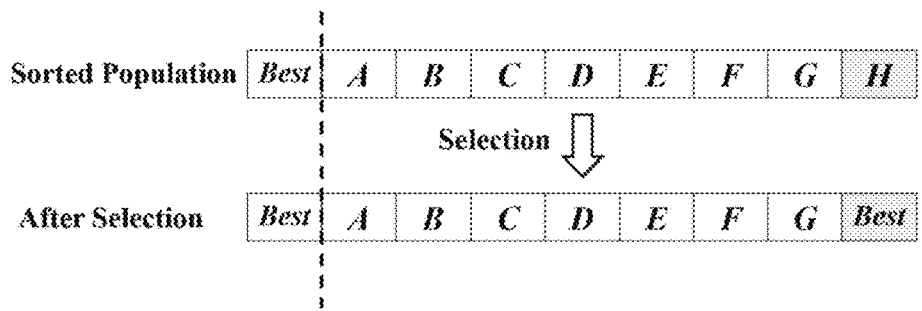
FIG. 6A, FIG. 6B and FIG. 6C illustrate the selection operator, the crossover operator and the mutation operator of the genetic operators of the proposed GA respectively, wherein three anchor locations represent a chromosome and eight chromosomes constitute a population, and the symbols $\alpha$, $\beta$, $\gamma$ and $\varphi$ represent anchor locations.
Figure 6B:
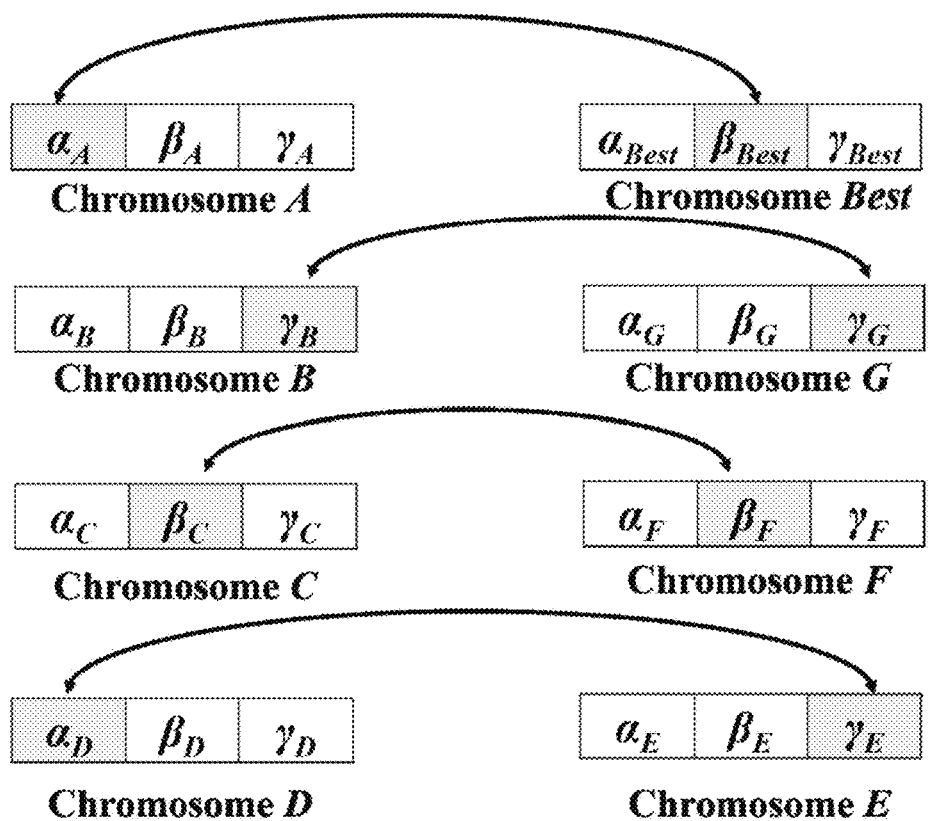
Figure 6C:
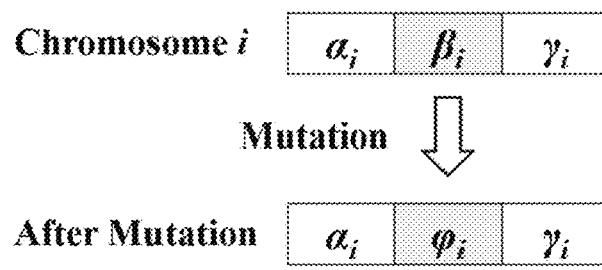

14346 and 32387 training data for UWB system with the circularly polarized antenna and the linearly polarized antenna are collected under NLOS conditions (FIG. 5) with various distances between anchor and tag. The quantity of validation data is 1594 and 3599, which is one tenth of total data. In this work, the structures and activation functions of DNN, CNN, and LSTM are optimized, and the measured range errors of one-to-one UWB system using various models with NLOS mitigation are shown in FIG. 6. The original measurement results of the system with common models and without NLOS mitigation are also depicted for comparison. Results show that the optimized LSTM model possesses the minimal range error in NLOS environment. For LOS scenario, the range error of the optimized LSTM model is still lower than the other NLOS mitigation models, validating the usefulness of the proposed model in the complicated environment with LOS and NLOS paths.

In practical test, the preprocessing and prediction of CIR take only 1.31, 1.92, and 2.14 ms by using optimized DNN, optimized LSTM, and optimized CNN, respectively, and the positioning time using gradient descent in Algorithm 1 is 10.23 ms in average. Thus, the key to accelerate the real time positioning and tracking with NLOS mitigation is the calculating time of gradient descent method in Algorithm 1. Reducing the maximal number of iterations speeds up the calculation, but the result becomes hard to converge toward the minimum of the loss function (3). By considering the trade-off between efficiency and accuracy, the error of wireless positioning and tracking using NLOS mitigation achieves 20-30 cm within 20 ms calculating time with 500 iterations.

[Section II]

(1) Optimal Anchor Location

Figure 7:
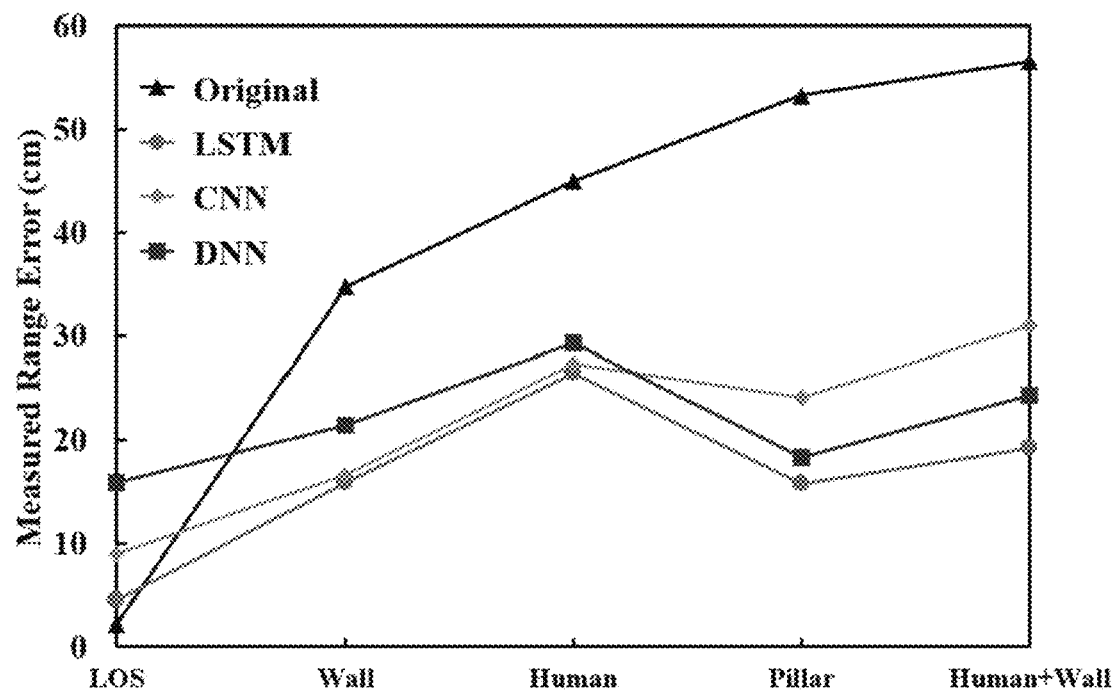
FIG. 7 illustrates the measured range errors of one-to-one UWB system using NLOS mitigation with various models. The original measurement result without NLOS mitigation is also depicted for comparison.
Figure 8:
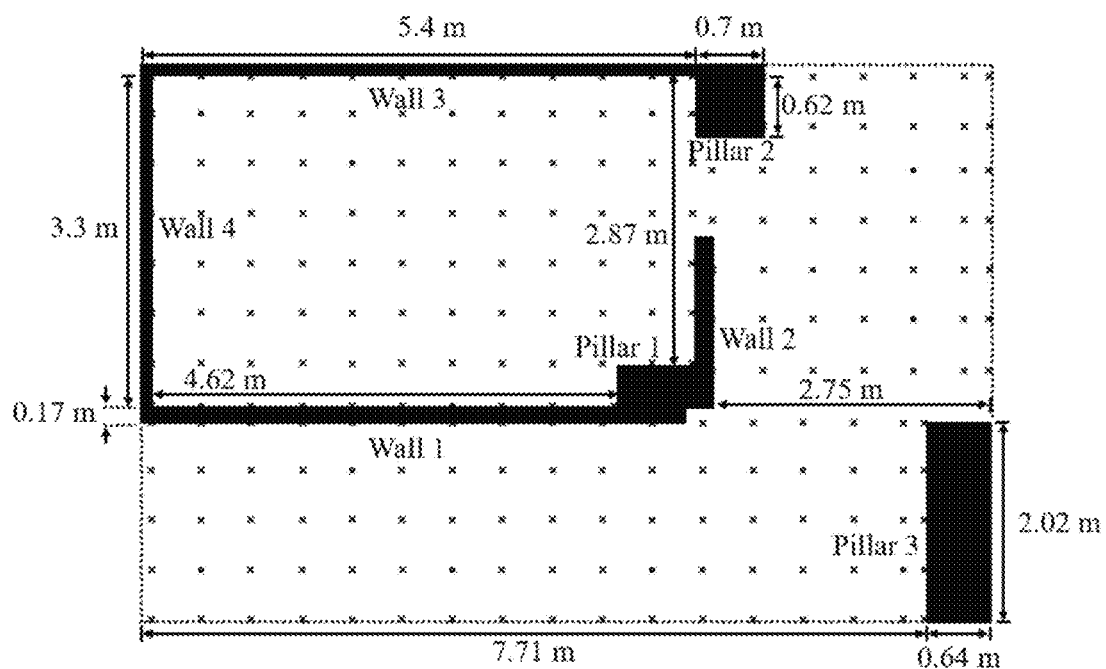
FIG. 8 illustrates the floor plane for UWB positioning system verification. The 226 candidate anchor locations are shown as the crosses.

FIG. 7 displays the experimental setup that is performed in a practical environment, including one room, three pillars, four concrete walls, and two corridors. The proposed GA is applied to determine the anchor locations. The number of anchors is three, which is the minimal number for positioning the tag in a 2D plane, and the number of chromosomes is eight. The optimal anchor locations can be obtained from 226 candidate anchor locations by using the proposed GA in Algorithm 2 with gradient descent method in Algorithm 1 and the Gaussian distributions in FIG. 5B. The root-mean-square error (RMSE) of each tag location is:

$$e_{RMS} = \sqrt{\frac{\sum_{i=1}^{N}(x_i - x_t)^2 + (y_i - y_t)^2}{N}}, \quad (10)$$

where the number of simulations N is 1000, $(x_i, y_i)$ is the i-th calculated location and $(x_T, y_T)$ is the tag location. The error of each anchor placement is the average RMSE of all tag locations. FIG. 8 plots the minimal errors of the best anchor placements in each iteration. The error decreases remarkably as the number of iterations increases, validating the effectiveness of the proposed GA. The final simulation error using this GA with 100 iterations is 36.72 cm, which is 8.48 cm less than the initial error 45.20 cm. After 100 iterations, the optimal anchor locations with the minimal average RMSE of tag locations are obtained and shown as the red rectangles in FIG. 7. The RMSE of each tag location is represented by the colored squares in the experimental environment. Compared to the other tag locations, the RMSEs of tag locations behind the pillars are large, which is due to the severe NLOS conditions.

(2) Adaptive NLOS Mitigation

Figure 9:
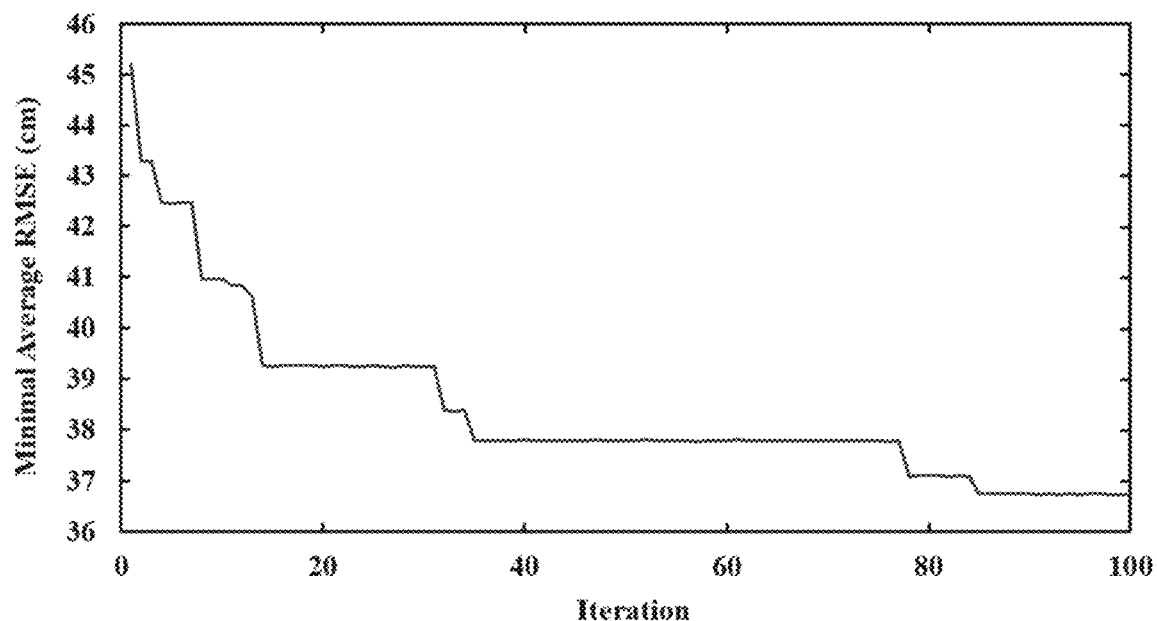
FIG. 9 illustrates the minimal average RMSE of tag location in each GA iteration.
Figure 10:
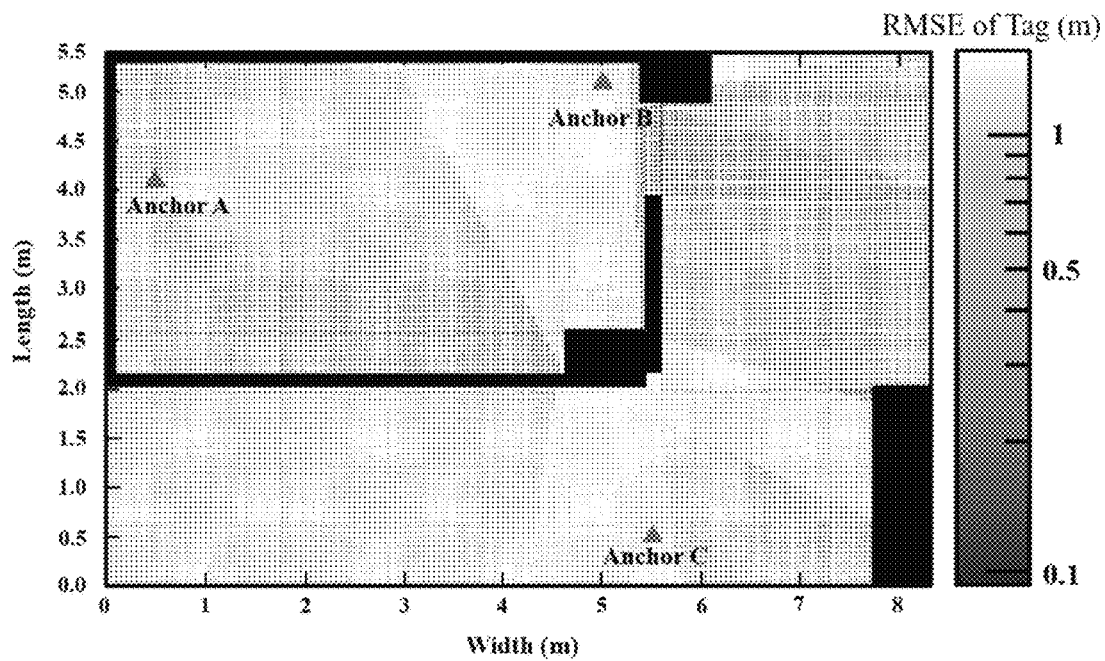
FIG. 10 illustrates the simulated RMSEs of all tag locations with the colored squares, and the values of RMSEs are shown in log scale on the right-hand side and the three best anchor locations are depicted as triangles.
Figure 11:
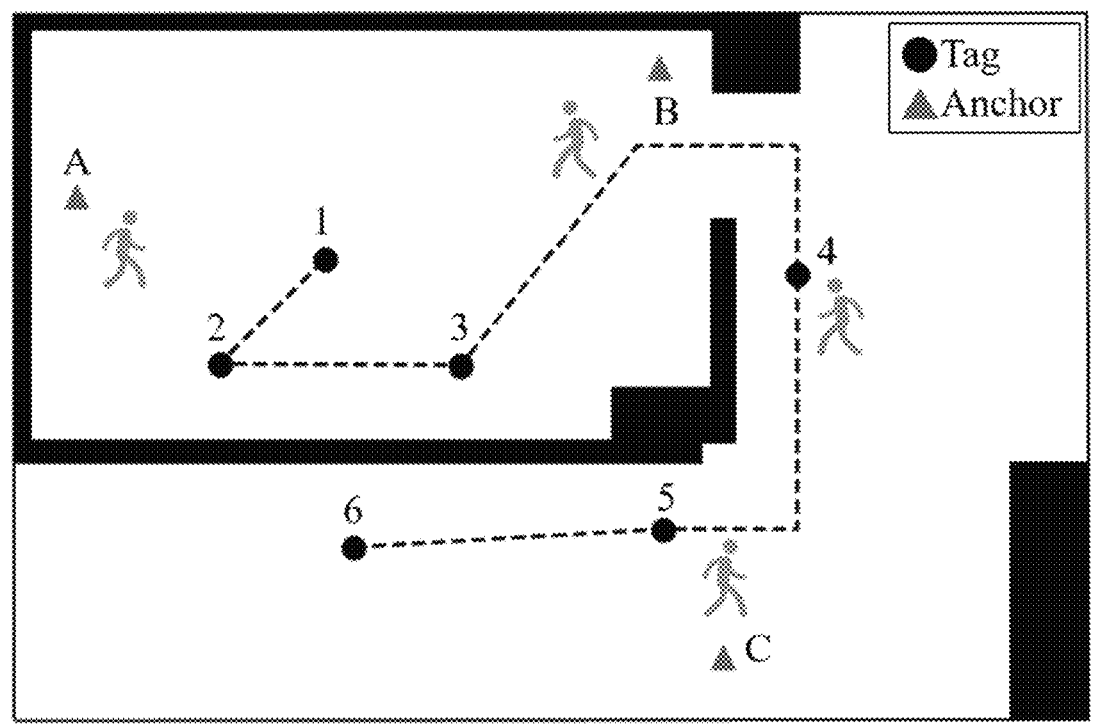
FIG. 11 illustrates the anchor and tag locations for experimental validation of various models and the dashed line is the indoor tracking trace.

As shown in FIG. 11, the measurement setup in the area with concrete walls, pillars, and walking humans is built to verify the machine learning methods. In FIG. 9B and FIG. 9C, three anchors A, B, and C are utilized to determine the RMSE of six tag locations 1, 2, 3, 4, 5 and 6. To achieve severe NLOS conditions, two people move randomly in the space between tag A and B and anchor 1, 2 and 3 in the room, and the other two people move randomly in the space between tag C and anchor 4, 5 and 6 outside the room. The tag uses the linearly polarized antenna (FIG. 1A), and the anchors use both the linearly polarized antenna and the circularly polarized antenna (FIG. 1B) for comparison.

Figure 12:
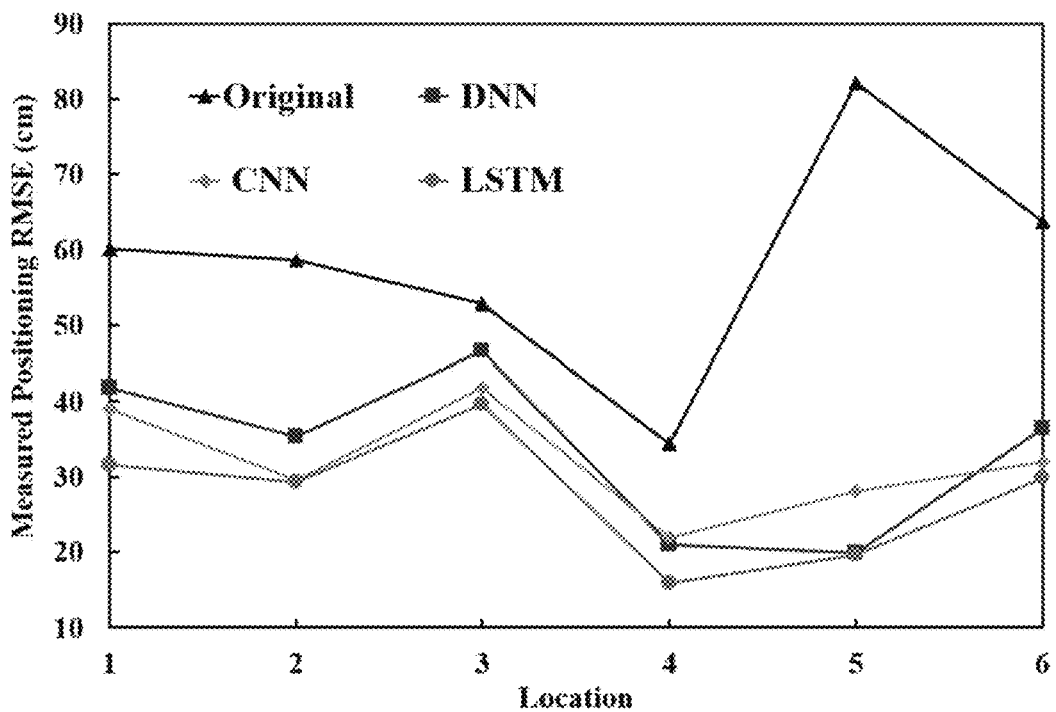
FIG. 12 illustrates the measured positioning RMSEs of tag location 1 to 6 with various optimized models and the original measurement result without NLOS mitigation is also depicted for comparison.
Figure 13:
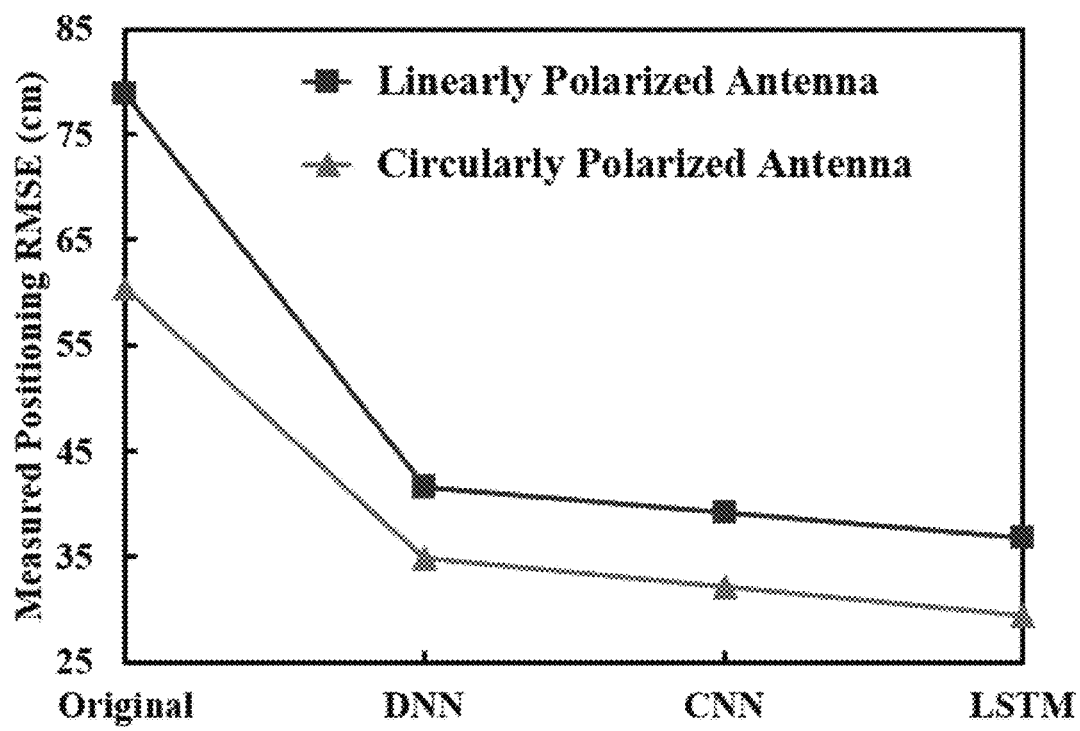
FIG. 13 illustrates the measured positioning RMSEs of tag locations with various optimized models using the linearly polarized antenna and the proposed circularly polarized antenna and the original measurement result without NLOS mitigation is also depicted for comparison.

Please refer to FIG. 12. FIG. 12 illustrates the measurements of UWB positioning system in locations 1 to 6 of FIG. 11. There are 2600 positioning tests of each location. The result demonstrates that RMSE using the optimized LSTM model is less than those using the other models under severe NLOS conditions. To verify the effect of antennas on UWB positioning system, the RMSEs of location 1 to 6 using various optimized models with the linearly polarized and the circularly polarized antennas are shown in FIG. 13. With and without NLOS mitigation, the error of tag position by using the circularly polarized antenna is much less than that by using the linearly polarized antenna, revealing that the low variation of antenna time delay is critical under severe NLOS conditions. Moreover, the optimized LSTM model with either linearly or circularly polarized antennas still possesses the minimal RMSE. These results demonstrate that the proposed circularly polarized antenna and optimized LSTM model are effective and accurate for the positioning and tracking of autonomous vehicle in the complicated NLOS indoor environment.

Figure 14:
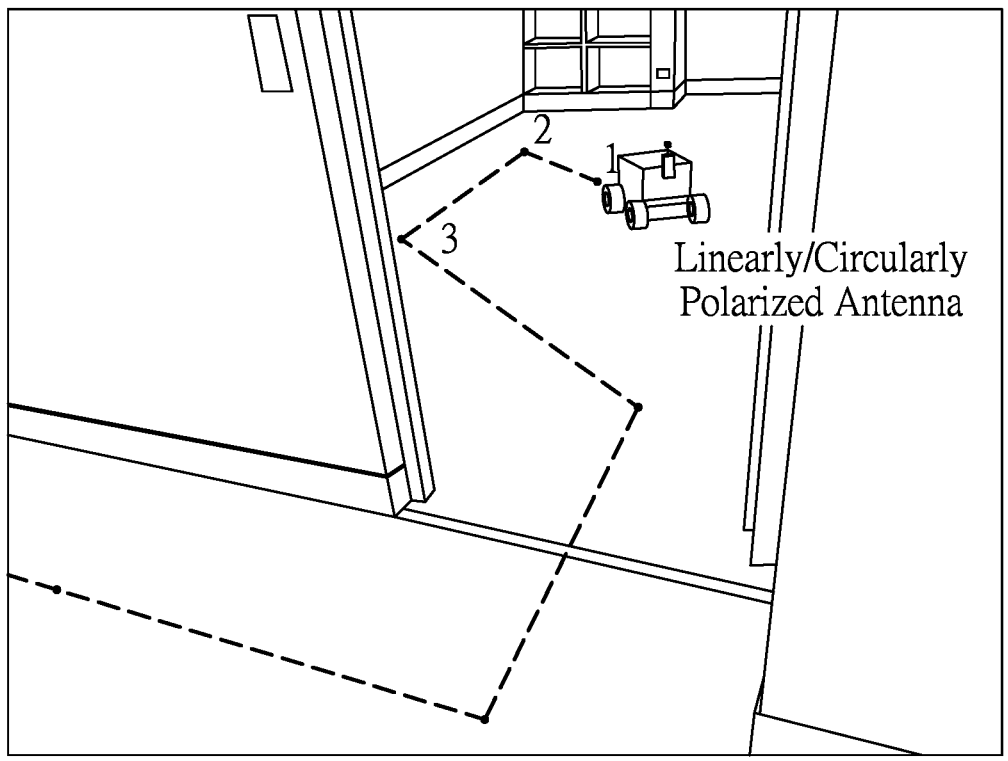
FIG. 14 illustrates the experiment environment with a tag mounted on an autonomous vehicle.
Figure 15A:
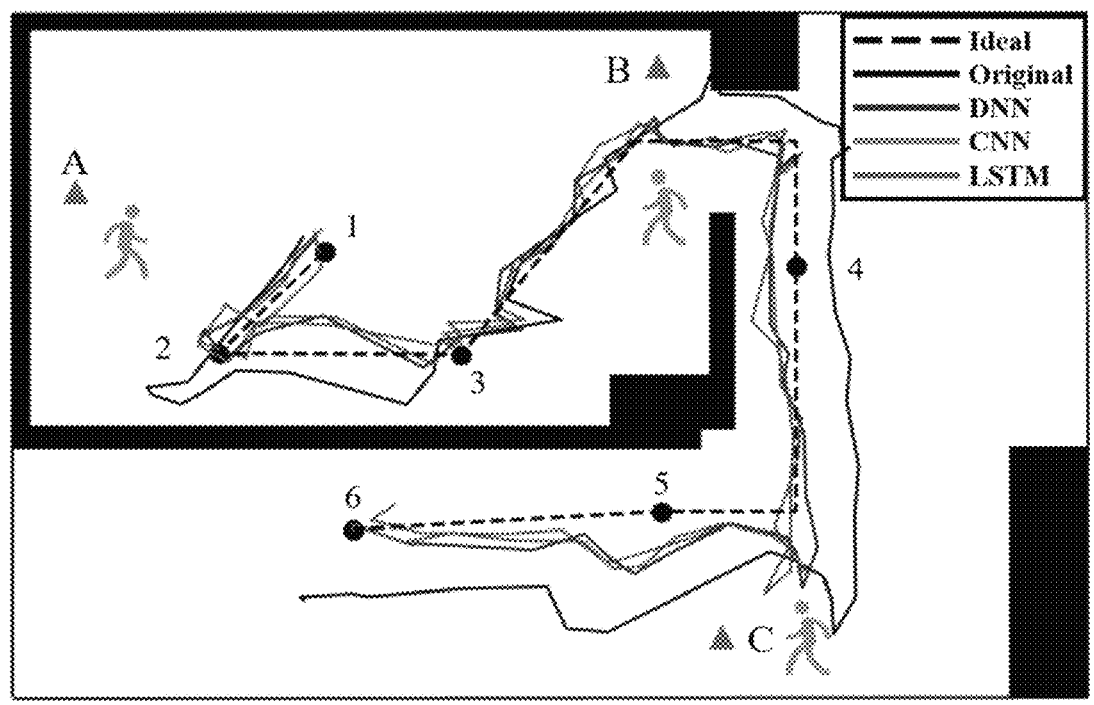
FIG. 15A illustrates the original trace and the indoor tracking traces using various machine learning models, and two experiments are carried out with the conventional linearly polarized antennas in the prior art.
Figure 15B:
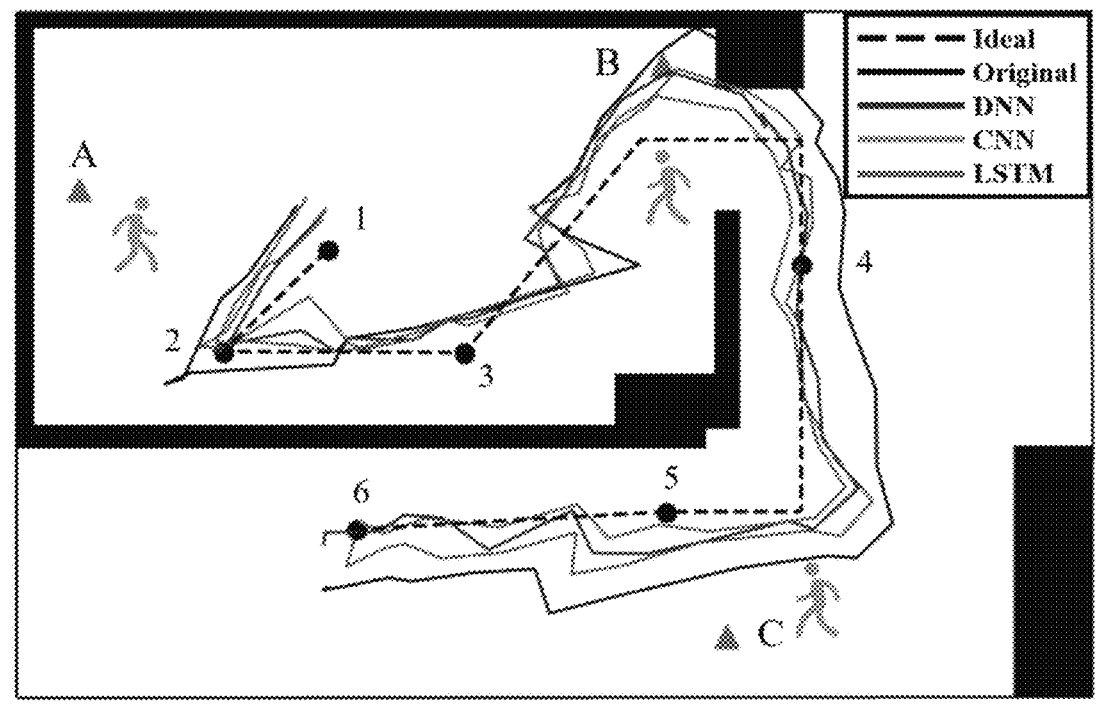
FIG. 15B illustrates the original trace and the indoor tracking traces using various machine learning models, and two experiments are carried out with the proposed circularly polarized antennas.
Figure 16A:
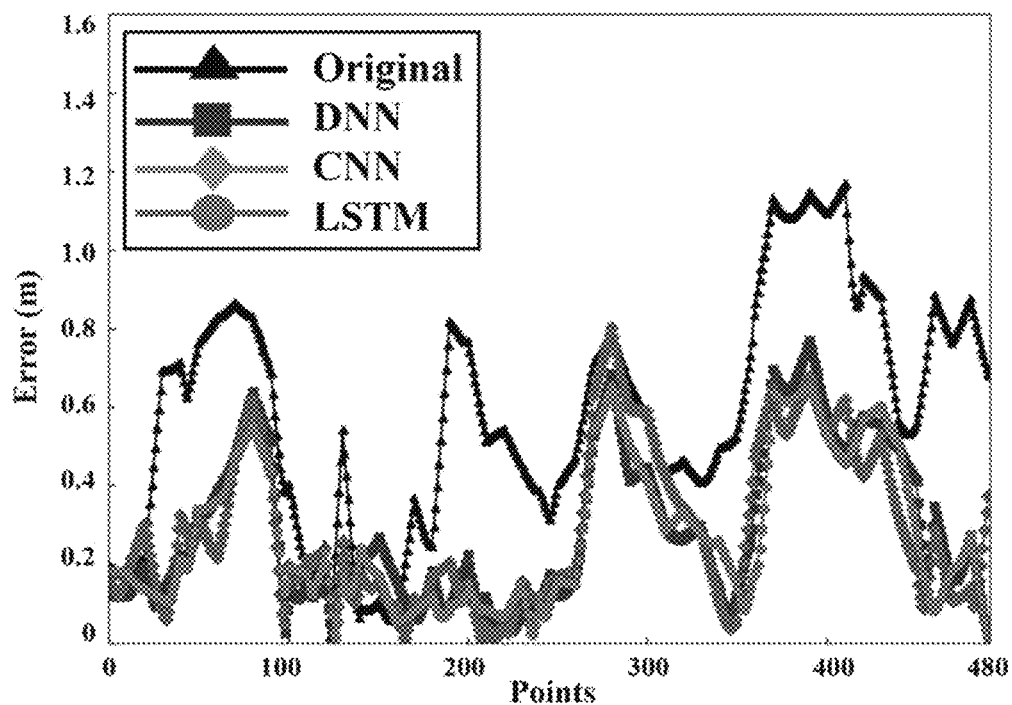
FIG. 16A illustrates the indoor tracking errors of all measured points using various machine learning models with the linearly polarized antennas in the prior art.
Figure 16B:
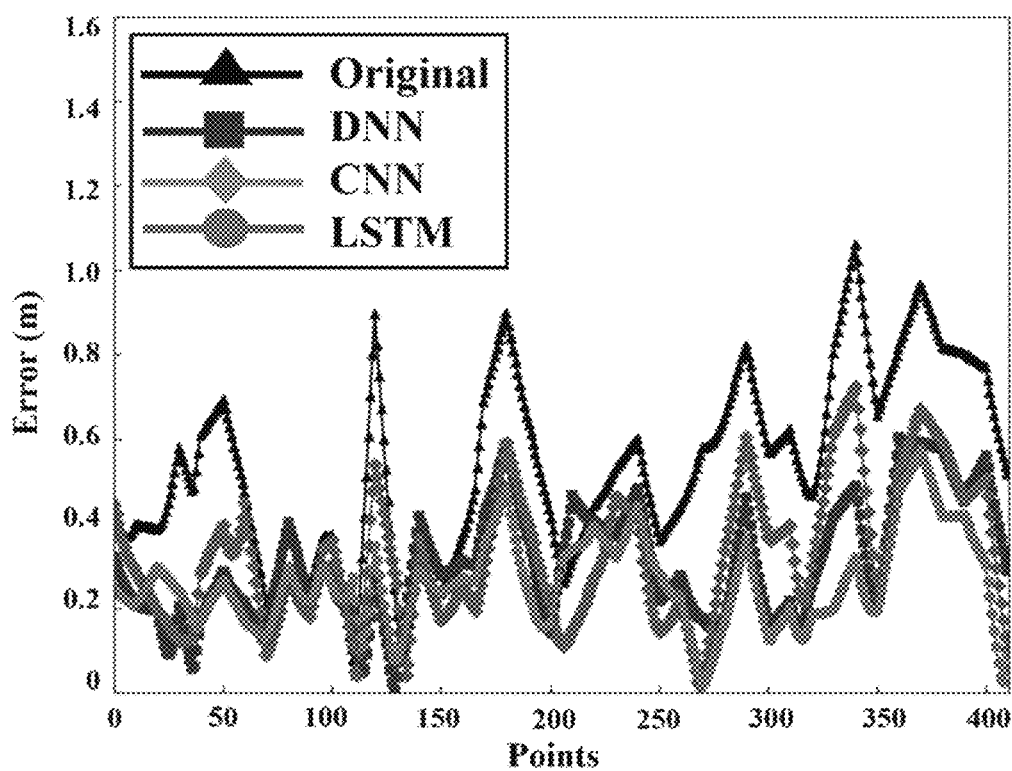
FIG. 16B illustrates the indoor tracking errors of all measured points using various machine learning models with the circularly polarized antennas.

As shown in FIG. 14, the experiment of indoor tracking is validated by mounting the tag on an autonomous vehicle, and the locations of anchors and the trace of vehicle are shown in FIG. 11. The tracking system determines the location of tag as the vehicle moves along the trace with 5 km/hr stable speed. During the experiment, three people move randomly in the space to cause the severe NLOS conditions. The original trace and the traces through the adaptive NLOS mitigation using various optimized machine learning models are shown in FIG. 15B. The solid trace, which represents optimized LSTM model, is the closest to the ideal path of the vehicle (dashed trace), and the errors of all measured points on the traces are shown in FIG. 16B. The mean errors along the traces in different conditions are summarized in Table II.

TABLE II

| Antenna Type | NLOS Mitigation | Mean Error (cm) |
| --- | --- | --- |
| Linearly Polarized Antenna | Original | 59.3 |
| | Optimized DNN | 32.9 |
| | Optimized CNN | 31.1 |
| | Optimized LSTM | 27.6 |
| Circularly Polarized Antenna | Original | 54.1 |
| | Optimized DNN | 29.1 |
| | Optimized CNN | 28.9 |
| | Optimized LSTM | 26.1 |

It is believed that these results demonstrate that the proposed circularly polarized antenna and LSTM are effective and accurate for the positioning and tracking of autonomous vehicle in the complicated NLOS indoor environment.

Another embodiment of the invention is a positioning and tracking method with arbitrary target orientation, optimal anchor location, and adaptive NLOS mitigation for improving the accuracy of wireless positioning and tracking in the complicated indoor environment under LOS and NLOS conditions.

Figure 17:
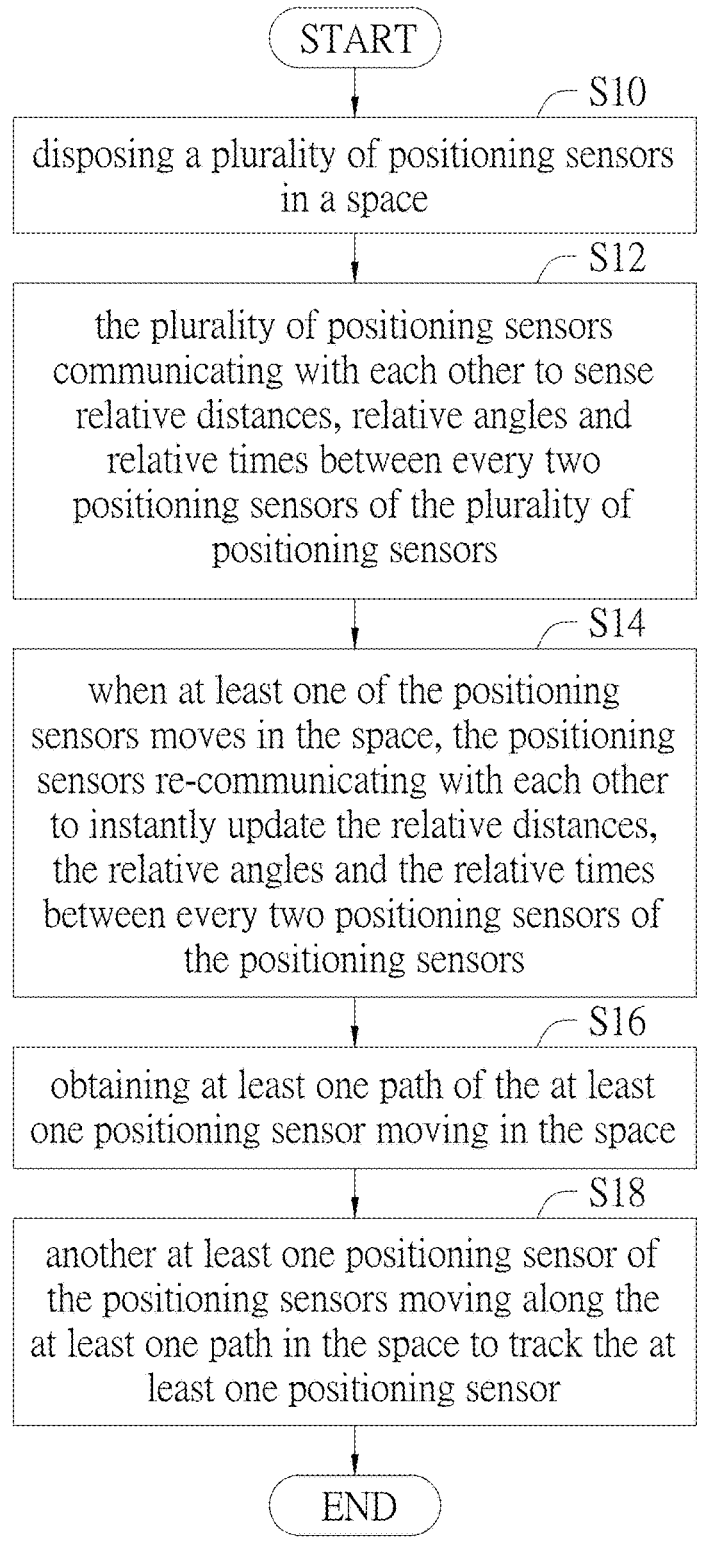
FIG. 17 illustrates a flowchart of the positioning and tracking method in another embodiment of the invention.

As shown in FIG. 17, the positioning and tracking method in this embodiment can include following steps of:

S10: disposing positioning sensors in a space, wherein the positioning sensors is all movable and all has functions of sensing distance, angle and time;

S12: the positioning sensors communicating with each other to sense relative distances, relative angles and relative times between every two positioning sensors of the positioning sensors;

S14: when at least one of the positioning sensors moves in the space, the positioning sensors re-communicating with each other to instantly update the relative distances, the relative angles and the relative times between every two positioning sensors of the positioning sensors;

S16: obtaining at least one path of the at least one positioning sensor moving in the space; and S18: another at least one positioning sensor of the positioning sensors moving along the at least one path in the space to track the at least one positioning sensor in a complicated NLOS environment.

[Section III]

Compared to the prior arts, a high-accuracy positioning and tracking UWB system in the indoor environment with severe NLOS condition is disclosed. By using the circularly polarized antenna with wide bandwidth and omnidirectional radiation, the orientation between anchor and tag is arbitrary. The time-domain performances including the signal fidelity and the time-delay variation of the proposed antenna are measured. The electromagnetic wave propagation models of the one-to-one UWB system with various NLOS scenarios are established by using the PDFs of Gaussian distributions. The locations of anchor in the UWB system are effectively optimized by introducing the proposed GA with the NLOS propagation models to minimize the RMSE of each tag location in dense multipath area. The adaptive NLOS mitigation is investigated by optimizing DNN, CNN and LSTM, and the deployment of the three-anchor UWB system is presented to demonstrate the positioning and tracking of autonomous vehicle in the complicated indoor environment. By using the proposed circularly polarized antenna and optimized LSTM model, the measured results of 20-30 cm positioning error for a 45 $m^2$ NLOS area with concrete walls, pillars and walking humans are shown, validating the proposed UWB system in practical applications. Unlike the conventional UWB indoor positioning approaches, the proposed system with efficient anchor deployment and high accuracy works well under LOS and NLOS conditions, thus making it attractive for wireless positioning and tracking.

What is claimed is:

1. A positioning and tracking system, comprising:
   a plurality of positioning sensors disposed in a space, wherein the plurality of positioning sensors is all movable and all has functions of sensing distance, angle and time, and the plurality of positioning sensors communicates with each other to sense relative distances, relative angles and relative times between every two positioning sensors of the plurality of positioning sensors;
   wherein when at least one of the plurality of positioning sensors moves in the space, the plurality of positioning sensors re-communicates with each other to instantly update the relative distances, the relative angles and the relative times between every two positioning sensors of the plurality of positioning sensors.

2. The positioning and tracking system of claim 1, wherein the plurality of positioning sensors communicates with each other through ultra-wideband (UWB) technology.

3. The positioning and tracking system of claim 1, wherein the positioning and tracking system uses circularly polarized antennas with omnidirectional radiation and low time-delay variation to achieve independent orientation of the plurality of positioning sensors.

4. The positioning and tracking system of claim 1, wherein the plurality of positioning sensors comprises at least one anchor and at least one tag, the at least one anchor and the at least one tag communicate with each other to sense relative distances, relative angles and relative times between them; the at least one of the plurality of positioning sensors moving in the space is anchor and/or tag.

5. The positioning and tracking system of claim 4, wherein an orientation between the at least one anchor and the at least one tag is arbitrary by using a circularly polarized antenna with wide bandwidth and omnidirectional radiation.

6. The positioning and tracking system of claim 4, wherein at least one location of the at least one anchor is optimized to minimize average positioning error of the at least one tag by using genetic algorithm (GA) with non-line-of-sight (NLOS) electromagnetic wave models.

7. The positioning and tracking system of claim 1, wherein after the relative distances, the relative angles and the relative times of the plurality of positioning sensors are instantly updated, at least one path of the at least one positioning sensor moving in the space is obtained.

8. The positioning and tracking system of claim 7, wherein the at least one path is calibrated by Deep Neural Network (DNN), Convolutional Neural Network (CNN) or Long-Short Term Memory (LSTM) model to develop adaptive NLOS mitigation.

9. The positioning and tracking system of claim 7, wherein another at least one positioning sensor of the plurality of positioning sensors moves along the at least one path in the space to track the at least one positioning sensor in a complicated NLOS environment.

10. The positioning and tracking system of claim 7, wherein the at least one path is a non-closed path or a closed path forming at least one area.

11. A positioning and tracking method, comprising steps of:
   disposing a plurality of positioning sensors in a space, wherein the plurality of positioning sensors is all movable and all has functions of sensing distance, angle and time;

the plurality of positioning sensors communicating with each other to sense relative distances, relative angles and relative times between every two positioning sensors of the plurality of positioning sensors; and when at least one of the plurality of positioning sensors moves in the space, the plurality of positioning sensors re-communicating with each other to instantly update the relative distances, the relative angles and the relative times between every two positioning sensors of the plurality of positioning sensors.

12. The positioning and tracking method of claim 11, wherein the plurality of positioning sensors communicates with each other through ultra-wideband (UWB) technology.

13. The positioning and tracking method of claim 11, further comprising: using circularly polarized antennas with omnidirectional radiation and low time-delay variation to achieve independent orientation of the plurality of positioning sensors.

14. The positioning and tracking method of claim 11, wherein the plurality of positioning sensors comprises at least one anchor and at least one tag, the at least one anchor and the at least one tag communicate with each other to sense relative distances, relative angles and relative times between them; the at least one of the plurality of positioning sensors moving in the space is anchor and/or tag.

15. The positioning and tracking method of claim 14, wherein an orientation between the at least one anchor and the at least one tag is arbitrary by using a circularly polarized antenna with wide bandwidth and omnidirectional radiation.

16. The positioning and tracking method of claim 14, wherein at least one location of the at least one anchor is optimized to minimize average positioning error of the at least one tag by using genetic algorithm (GA) with non-line-of-sight (NLOS) electromagnetic wave models.

17. The positioning and tracking method of claim 11, further comprising: after the relative distances, the relative angles and the relative times of the plurality of positioning sensors are instantly updated, obtaining at least one path of the at least one positioning sensor moving in the space.

18. The positioning and tracking method of claim 17, wherein the at least one path is calibrated by Deep Neural Network (DNN), Convolutional Neural Network (CNN) or Long-Short Term Memory (LSTM) model to develop adaptive NLOS mitigation.

19. The positioning and tracking method of claim 17, further comprising: another at least one positioning sensor of the plurality of positioning sensors moving along the at least one path in the space to track the at least one positioning sensor in a complicated NLOS environment.

20. The positioning and tracking method of claim 17, wherein the at least one path is a non-closed path or a closed path forming at least one area.

* * * * *